(12) United States Patent
Chen et al.

(10) Patent No.: US 9,121,998 B2
(45) Date of Patent: Sep. 1, 2015

(54) SILICONE HYDROGEL CONTACT LENSES

(75) Inventors: Charlie Chen, San Ramon, CA (US); Yuwen Liu, Dublin, CA (US); Yuan Xu, Fremont, CA (US); Ying Zheng, Pleasanton, CA (US); Junhao Ge, Fremont, CA (US); Li Yao, Johns Creek, GA (US); Arthur Back, Danville, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 211 days.

(21) Appl. No.: 13/983,578

(22) PCT Filed: Feb. 23, 2012

(86) PCT No.: PCT/US2012/026231
§ 371 (c)(1),
(2), (4) Date: Sep. 30, 2013

(87) PCT Pub. No.: WO2012/118686
PCT Pub. Date: Sep. 7, 2012

(65) Prior Publication Data
US 2014/0024738 A1    Jan. 23, 2014

Related U.S. Application Data

(60) Provisional application No. 61/447,143, filed on Feb. 28, 2011, provisional application No. 61/447,180, filed on Feb. 28, 2011.

(51) Int. Cl.
*C08L 101/14*   (2006.01)
*C08L 83/04*    (2006.01)
*G02C 7/04*     (2006.01)
*G02B 1/04*     (2006.01)

(52) U.S. Cl.
CPC ..................................... *G02B 1/043* (2013.01)

(58) Field of Classification Search
None
See application file for complete search history.

(56) References Cited

U.S. PATENT DOCUMENTS

| | | | | |
|---|---|---|---|---|
| 4,153,641 A * | 5/1979 | Deichert et al. | ............. | 526/264 |
| 4,711,943 A | 12/1987 | Harvey, III | | |
| 5,352,714 A * | 10/1994 | Lai et al. | ........................ | 523/107 |
| 5,358,995 A * | 10/1994 | Lai et al. | ........................ | 524/542 |
| 5,374,662 A * | 12/1994 | Lai et al. | ........................ | 522/172 |
| 5,451,617 A * | 9/1995 | Lai et al. | ........................ | 523/107 |
| 5,760,100 A * | 6/1998 | Nicolson et al. | ............... | 523/106 |
| 5,789,461 A * | 8/1998 | Nicolson et al. | ............... | 523/106 |
| 5,914,355 A * | 6/1999 | Kunzler | ........................ | 523/106 |
| 5,945,465 A * | 8/1999 | Ozark et al. | ................... | 523/106 |
| 5,962,548 A * | 10/1999 | Vanderlaan et al. | ........... | 523/107 |
| 7,691,916 B2 * | 4/2010 | McCabe et al. | .................. | 522/99 |
| 8,952,080 B2 * | 2/2015 | Jan | ................... | 523/107 |
| 2007/0035693 A1 * | 2/2007 | Back | .......................... | 351/160 R |
| 2007/0104611 A1 * | 5/2007 | Marmo et al. | ................... | 422/22 |
| 2007/0105974 A1 * | 5/2007 | Nicolson et al. | ............... | 523/106 |
| 2007/0291223 A1 * | 12/2007 | Chen et al. | ................. | 351/160 R |
| 2007/0296914 A1 * | 12/2007 | Hong et al. | ................ | 351/160 H |
| 2008/0048350 A1 * | 2/2008 | Chen et al. | .................... | 264/2.6 |
| 2008/0067702 A1 * | 3/2008 | Yao et al. | ........................ | 264/1.1 |
| 2009/0018233 A1 * | 1/2009 | Nunez et al. | ................... | 523/107 |
| 2009/0039535 A1 * | 2/2009 | Nicolson et al. | ............... | 264/1.1 |
| 2009/0234089 A1 * | 9/2009 | Ueyama et al. | ................ | 526/279 |
| 2009/0299022 A1 * | 12/2009 | Ichinohe | ........................ | 526/279 |

OTHER PUBLICATIONS

Structure search, STIC for case 13985109, dated May 27, 2015.*
International Search Report and Written Opinion issued in corresponding International Patent Application No. PCT/US2012/026231 dated Jun. 8, 2012 (12 pages).

* cited by examiner

*Primary Examiner* — James J Seidleck
*Assistant Examiner* — Peter A Salamon
(74) *Attorney, Agent, or Firm* — Kilyk & Bowersox, P.L.L.C.

(57) ABSTRACT

Silicone hydrogel contact lenses are described. The lenses are derived from a polymerizable composition including 30-60 unit parts by weight of a hydrophilic monomer(s) having one N-vinyl group, 10 to 50 unit parts by weight of 2-hydroxyethyl methacrylate (HEMA), and a first siloxane monomer component comprising a siloxane monomer of formula (1) as described herein or a siloxane monomer of formula (2) as described herein or a siloxane monomer of formula (3) as described herein or any combination thereof, where the total amount of siloxane monomer(s) present in the polymerizable composition is from 15 to 40 unit parts by weight. Batches of silicone hydrogel contact lenses and methods of making silicone hydrogel contact lenses are also described.

20 Claims, No Drawings

SILICONE HYDROGEL CONTACT LENSES

This application is a National Stage Application of PCT/US2012/026231, filed Feb. 23, 2012, and which claims the benefit under 35 U.S.C. §119(e) of U.S. Provisional Patent Application No. 61/447,180, filed Feb. 28, 2011, and U.S. Provisional Patent Application No. 61/447,143, filed Feb. 28, 2011, each of which is incorporated in its entirety by reference herein.

FIELD

The present disclosure is directed to silicone hydrogel contact lenses and related compositions and methods.

BACKGROUND

Commercially and clinically, silicone hydrogel contact lenses are a popular alternative to conventional hydrogel contact lenses (i.e., hydrogel contact lenses that do not contain silicone or silicone-containing ingredients). The presence of siloxanes in silicone hydrogel contact lens formulations is believed to affect the properties of silicone hydrogel contact lenses obtained therefrom. For example, it is believed that the presence of a siloxane component in a polymerizable composition used to form a contact lens results in a relatively higher oxygen permeability compared to a conventional hydrogel contact lens without a siloxane component. In addition, it is believed that the presence of a siloxane component in the polymerizable composition increases the likelihood of hydrophobic domains being present on the lens surface of a silicone hydrogel contact lens as compared to a conventional hydrogel contact lens without a siloxane component. The first generation of silicone hydrogel contact lenses provided high levels of oxygen, even though the wettability of the lenses tended to be lower than might be desired. Techniques have been developed to overcome the hydrophobicity issues of silicone hydrogel contact lens surfaces. Based on the popularity of silicone hydrogel contact lenses, there continues to be a need for new silicone hydrogel contact lenses which are both inexpensive to manufacture and ophthalmically compatible.

Some documents describing silicone hydrogel contact lenses include: U.S. Pat. Nos. 4,711,943, 5,712,327, 5,760,100, 7,825,170, 6,867,245, US20060063852, US20070296914, U.S. Pat. No. 7,572,841, US20090299022, US20090234089, and US20100249356, each of which is incorporated in its entirety by reference herein.

SUMMARY

It has been discovered that miscible polymerizable compositions can be prepared using particular proportions of siloxane monomers having particular structures, in combination with particular proportions of at least one hydrophilic amide monomer having one N-vinyl group and particular proportions of 2-hydroxyethyl methacrylate (HEMA), and that these polymerizable compositions, when used to prepare silicone hydrogel contact lenses, result in ophthalmically acceptably clear lenses having advantageous properties making them useful as contact lenses, and that these lenses can be manufactured at relatively low costs.

The present disclosure relates to new silicone hydrogel contact lenses. A silicone hydrogel contact lens, in accordance with the present disclosure, comprises a polymeric lens body. The polymeric lens body is the reaction product of a polymerizable composition. The polymerizable composition comprises a plurality of lens forming ingredients, such that when the composition is polymerized, a polymeric lens body is obtained.

In one example, the present disclosure is directed to a miscible polymerizable composition suitable for use in producing the present silicone hydrogel contact lenses. The miscible polymerizable composition comprises (a) at least one hydrophilic amide monomer having one N-vinyl group; (b) 2-hydroxyethyl methacrylate (HEMA); and (c) a first siloxane monomer component. The at least one hydrophilic amide monomer having one N-vinyl group is present in the polymerizable composition an amount of from about 30 to about 60 unit parts by weight. The HEMA is present in the polymerizable composition in an amount of from about 10 to about 50 unit parts by weight. The first siloxane monomer component is present in the polymerizable composition is an amount of from about 15 to about 40 unit parts by weight. The first siloxane monomer component of the polymerizable composition comprises at least one siloxane monomer selected from a siloxane monomer of formula (1), a siloxane monomer of formula (2), a siloxane monomer of formula (3), or any combination thereof, wherein the siloxane monomer of formula (1) is a siloxane monomer represented by formula (1):

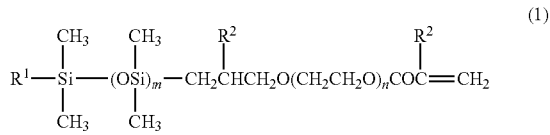

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group. The siloxane of formula (2) is a siloxane monomer represented by formula (2):

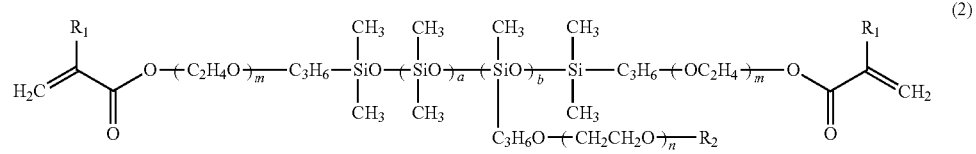

wherein $R^1$ of formula (2) is selected from either hydrogen or a methyl group; $R^2$ of formula (2) is selected from either of hydrogen or a C1-4 hydrocarbon group; m of formula (2) represents an integer of from 0 to 10; n of formula (2) represents an integer of from 4 to 100; a and b of formula (2) represent integers of 1 or more; a+b of formula (2) is equal to 20-500; b/(a+b) is equal to 0.01-0.22, and the configuration of siloxane units includes a random configuration. The siloxane monomer of formula (3) is a siloxane monomer represented by formula (3):

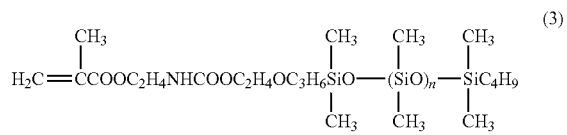

wherein n of formula (3) is an integer from 0-30.

As disclosed herein, the present polymerizable composition comprises a hydrophilic amide monomer having one N-vinyl group. The hydrophilic amide monomer having one N-vinyl group can comprise or consist of N-vinyl formamide, or N-vinyl acetamide, or N-vinyl-N-ethyl acetamide, or N-vinyl isopropylamide, or N-vinyl-N-methyl acetamide (VMA), or N-vinyl pyrrolidone (NVP), or N-vinyl caprolactam, or any combination thereof. In one example, the hydrophilic monomer or hydrophilic monomer component can comprise or consist of N-vinyl-N-methyl acetamide (VMA), or N-vinyl pyrrolidone (NVP), or both. The hydrophilic monomer or monomer component can comprise or consist of VMA. The hydrophilic monomer or monomer component can comprise or consist of NVP. The hydrophilic amide monomer having one N-vinyl group can be present in the polymerizable composition in an amount of from 30 to 50 unit parts by weight, or in an amount of from 30 to 45 unit parts by weight.

As described herein, the polymerizable composition comprises the hydrophilic monomer hydroxyethyl methacrylate (HEMA). The HEMA can be present in the polymerizable composition in an amount of from 15 to 45 unit parts by weight, or in an amount of from 25 to 35 unit parts by weight in a total amount from about 0.01 unit parts to about 5.0 unit parts by weight.

The polymerizable composition of the present disclosure also comprises a first siloxane monomer component. The first siloxane monomer component comprises one or more siloxanes selected from the siloxane monomer of formula (1) as described herein, the siloxane monomer of formula (2) as described herein, the siloxane monomer of formula (3) as described herein, or any combination thereof.

The siloxane monomer of formula (1) is a siloxane monomer represented by formula (1):

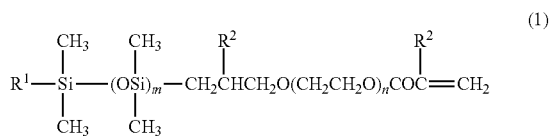

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group. A particular example of the siloxane of formula (1) is a siloxane monomer represented by formula (1):

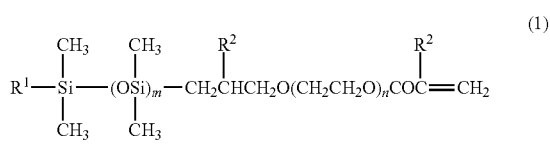

wherein m of formula (1) is 4, n of formula (1) is 1, $R^1$ of formula (1) is a butyl group, and each $R^2$ of formula (1) is independently either a hydrogen atom or a methyl group. In a more particular example, the siloxane monomer of formula (1) can be a siloxane monomer of either structure described in this paragraph having a number average molecular weight of from 400 to 700 daltons.

The siloxane of formula (2) is a siloxane monomer represented by formula (2):

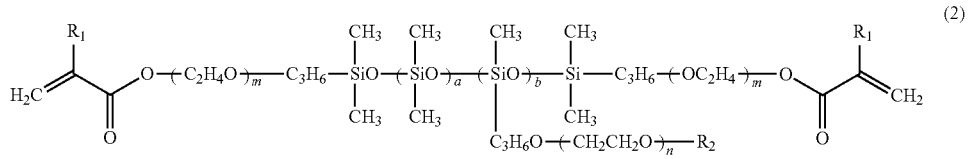

wherein $R^1$ of formula (2) is selected from either hydrogen or a methyl group; $R^2$ of formula (2) is selected from either of hydrogen or a C1-4 hydrocarbon group; m of formula (2) represents an integer of from 0 to 10; n of formula (2) represents an integer of from 4 to 100; a and b of formula (2) represent integers of 1 or more; a+b of formula (2) is equal to 20-500; b/(a+b) is equal to 0.01-0.22, and the configuration of siloxane units includes a random configuration. A particular example of the siloxane of formula (2) is a siloxane monomer represented by formula (2):

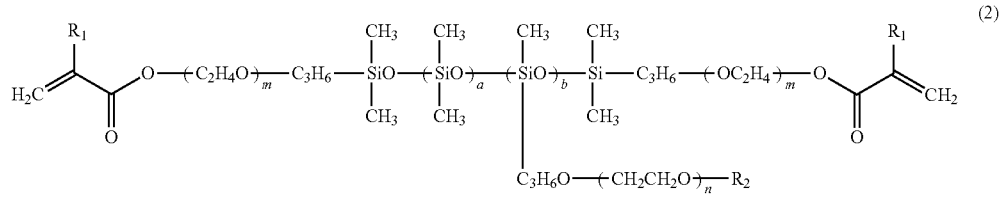

wherein m of formula (2) is 0, n of formula (2) is an integer from 5 to 15, a is an integer from 65 to 90, b is an integer from 1 to 10, R1 of formula (2) is a methyl group, and R2 of formula (2) is either a hydrogen atom or a hydrocarbon group having 1 to 4 carbon atoms, a and b of formula (2) represent integers of 1 or more; a+b of formula (2) is equal to 20-500; b/(a+b) is equal to 0.01-0.22, and the configuration of siloxane units includes a random configuration. In a more particular example, the siloxane monomer of formula (1) can be a siloxane monomer of either structure described in this paragraph having a number average molecular weight of at least 7,000 daltons.

The siloxane monomer of formula (3) is a siloxane monomer represented by formula (3):

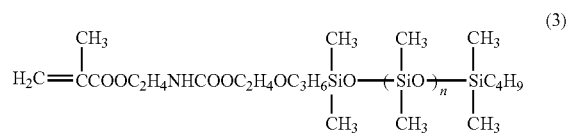

where n of formula (3) is an integer from 0-30. In one example, n of formula (3) can be an integer from 10-15. In another example, n of formula (3) can be an integer from 13-16. In another example, n of formula (3) can be an integer from 12-13. In yet another example, the siloxane monomer of formula (3) can have a number average molecular weight of from 1,000 to 2,000 daltons. In a particular example, the siloxane monomer of formula (3) can be a siloxane monomer of formula (3) where n of formula (3) is 12-16 which has a molecular weight of about 1,500 daltons.

In one example, the polymerizable composition can further comprise a second siloxane monomer, or a second siloxane monomer component. The second siloxane monomer component can comprise 3-[tris(trimethylsilyloxy)silyl]propyl methacrylate (TRIS), or a monomethacryloxypropyl terminated polydimethylsiloxane of formula (4), or both. The monomethacryloxypropyl terminated polydimethylsiloxane of formula (4) is a represented by formula (4):

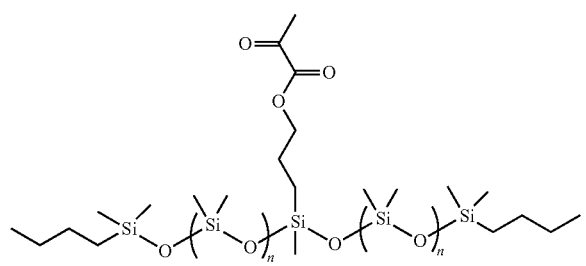

wherein n is an integer from 0-5. In one example of the siloxane monomer of formula (4), n is 3. A particular example of the siloxane monomer of formula (4) is a siloxane monomer having a number average molecular weight of from 750 to 1200 daltons, for example a number average molecular weight of about 1,100 daltons. This monomethacryloxypropyl terminated polydimethylsiloxane of formula (4) is referred to as MCS-M11.

The polymerizable compositions of the present disclosure can contain a total amount of siloxane monomer(s) of from 20 to 40 unit parts by weight. In other words, the total unit parts by weight of the first siloxane monomer component and, if present, the total unit parts by weight of the optional second siloxane monomer or monomer component, and, if present, the total unit parts by weight of any other optional siloxane monomers present in the polymerizable composition can be a sum of between 20 and 40 unit parts by weight.

The polymerizable composition of the present disclosure can further comprise at least one cross-linking agent. In one example, the at least one cross-linking agent can comprise a cross-linking agent having at least one vinyl polymerizable functional group in its molecular structure. The at least one cross-linking agent can be a cross-linking agent having at least one vinyl polymerizable functional group and at least one acrylate or methacrylate polymerizable functional group in its molecular structure. In another example, the at least one cross-linking agent can comprise a cross-linking agent component comprising comprise a cross-linking agent having at least one vinyl polymerizable functional group in its molecular structure, and a cross-linking agent having at least one vinyl polymerizable functional group and at least one acrylate or methacrylate polymerizable functional group in its molecular structure.

In one example, the polymerizable composition of the present disclosure can be free of N,N-dimethylacrylamide (DMA).

In one example when the first siloxane monomer component comprises the siloxane monomer of formula (3) in an amount of greater than 7 unit parts by weight, the polymerizable composition can further comprise at least one organic diluent. Alternatively, regardless of the composition of the first siloxane monomer component, the polymerizable composition can be free of an organic diluent.

The polymerizable composition of the present disclosure can be cured in an atmosphere consisting essentially of air. In another example, the polymerizable composition of the present disclosure can be cured in an atmosphere consisting essentially of one or more inert gasses, for example, a nitrogen gas atmosphere.

The polymerizable composition of the present disclosure can be thermally initiated, or can be UV initiated, or both. In one example, the polymerizable composition can be thermally initiated in an atmosphere consisting essentially of air.

The present disclosure is directed to polymeric lens bodies which are the reaction product of a polymerizable composition as described herein.

As described herein, a polymeric lens body which is the reaction product of a polymerizable composition of the present disclosure is an ophthalmically acceptably clear polymeric lens body. In one example, an ophthalmically acceptably clear polymeric lens body can be a lens body having a light transmittance of at least 90% for wavelengths from 380 nm to 780 nm. In another example, an ophthalmically acceptably clear polymeric lens body can be a lens body having a light transmittance of at least 95% for wavelengths from 380 nm to 780 nm.

The present disclosure is directed to silicone hydrogel contact lenses which comprise a polymeric lens body that is the reaction product of a polymerizable composition as described herein. In one example, the silicone hydrogel contact lens of the present disclosure is a silicone hydrogel contact lens, comprising: an ophthalmically acceptably clear polymeric lens body, the polymeric lens body being the reaction product of a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof, wherein the siloxane monomer of formula (1) is a siloxane monomer represented by formula (1):

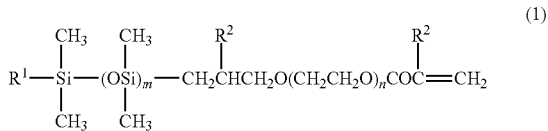

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group; the siloxane of formula (2) is a siloxane monomer represented by formula (2):

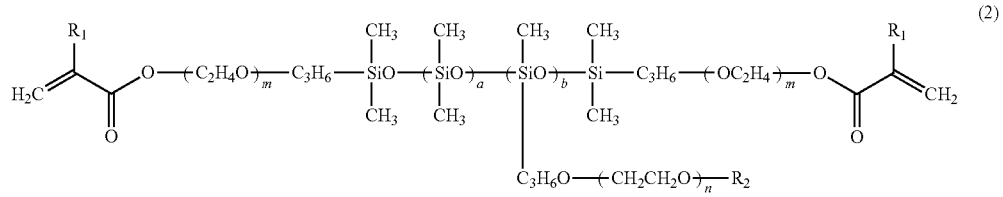

wherein $R^1$ of formula (2) is selected from either hydrogen or a methyl group; $R^2$ of formula (2) is selected from either of hydrogen or a C1-4 hydrocarbon group; m of formula (2) represents an integer of from 0 to 10; n of formula (2) represents an integer of from 4 to 100; a and b of formula (2) represent integers of 1 or more; a+b of formula (2) is equal to 20-500; b/(a+b) is equal to 0.01-0.22, and the configuration of siloxane units includes a random configuration; the siloxane monomer of formula (3) is a siloxane monomer represented by formula (3):

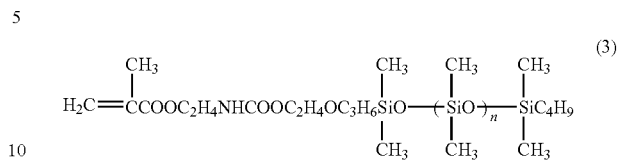

wherein n of formula (3) is an integer from 0-30.

The oxygen permeability (Dk) of a silicone hydrogel contact lens of the present disclosure can be from 20 to 110 barrers, or from 20 to 75 barrers. In one example, the oxygen permeability (Dk) of the silicone hydrogel contact lens can be from 50 to 70 barrers. In another example, the oxygen permeability (Dk) of the silicone hydrogel contact lens can be from 30 to 50 barrers.

The present disclosure is also directed to a batch of contact lenses comprising a plurality of contact lenses formed from polymeric lens bodies which are the reaction product of the polymerizable composition described herein. In one example, the batch of silicone hydrogel contact lenses has, when fully hydrated, has at least two average values selected from an average equilibrium water content (EWC) from about 30% to about 70%, an average tensile modulus from about 0.2 MPa to about 0.9 MPa, an average energy loss from about 25% to about 35%, and an average swell factor from about 24% to about 40%; based on averages of values determined for at least 20 individual lenses of the batch.

The present disclosure is also directed to methods of manufacturing silicone hydrogel contact lenses which comprise polymeric lens bodies which are the reaction product of a polymerizable composition as described herein. An example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof, wherein the siloxane monomer of formula (1) is a siloxane monomer represented by formula (1):

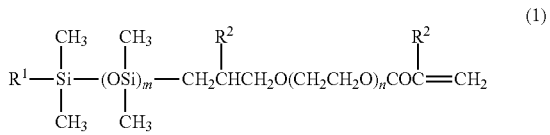

(1)

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group; the siloxane of formula (2) is a siloxane monomer represented by formula (2):

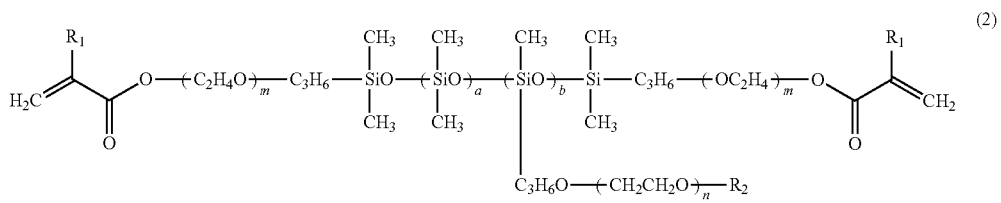

(2)

wherein $R^1$ of formula (2) is selected from either hydrogen or a methyl group; $R^2$ of formula (2) is selected from either of hydrogen or a C1-4 hydrocarbon group; m of formula (2) represents an integer of from 0 to 10; n of formula (2) represents an integer of from 4 to 100; a and b of formula (2) represent integers of 1 or more; a+b of formula (2) is equal to 20-500; b/(a+b) is equal to 0.01-0.22, and the configuration of siloxane units includes a random configuration; the siloxane monomer of formula (3) is a siloxane monomer represented by formula (3):

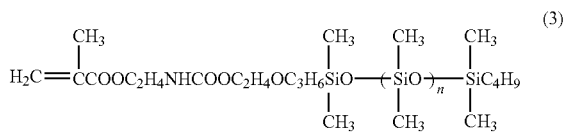

(3)

wherein n of formula (3) is an integer from 0-30; polymerizing the polymerizable composition in a contact lens mold assembly to form a polymeric lens body; contacting the polymeric lens body with a washing liquid to remove extractable material from the polymeric lens body; and packaging the polymeric lens body in a contact lens packaging solution in a contact lens package.

In one example, the polymerizing step of the method can comprise polymerizing the polymerizable composition in a contact lens mold assembly having a molding surface formed of a non-polar thermoplastic polymer to form a polymeric lens body. In another example, the polymerizing step of the method can comprise polymerizing the polymerizable composition in a contact lens mold assembly having a molding surface formed of a polar thermoplastic polymer to form a polymeric lens body.

In one example, the polymerizing step of the method can be conducted in an atmosphere consisting essentially of air. In another example, the polymerizing step of the method can be conducted in an atmosphere consisting essentially of one or more inert gasses, for example, a nitrogen gas atmosphere. The polymerizing step of the method can comprise a thermally initiated polymerization step, or a UV initiated polymerization step, or both. In a particular example, the polymerizing step can be a thermally initiated polymerization step conducted in an atmosphere consisting essentially of air.

In one example of the method, the contacting step of the method can comprise contacting the polymeric lens body with a washing liquid comprising at least one volatile organic solvent. In another example, the contacting step of the method can comprise contacting the polymeric lens body with a washing liquid free of a volatile organic solvent. In one particular example, the polymeric lens body as well as the silicone hydrogel contact lens are not contacted by a liquid comprising a volatile organic solvent during the manufacturing.

Additional embodiments of the polymerizable compositions, polymeric lens bodies, present lenses, lens products, batches of lenses, and methods of manufacturing contact lenses will be apparent from the following description, Examples, and claims. As can be appreciated from the foregoing and following description, each and every feature described herein, and each and every combination of two or more of such features, and each and every combination of one or more values defining a range, are included within the scope of the present invention provided that the features included in such a combination are not mutually inconsistent. In addition, any feature or combination of features or any value(s) defining a range may be specifically excluded from any embodiment of the present invention.

DETAILED DESCRIPTION

As described herein, it has now been discovered that silicone hydrogel contact lenses can be formed from polymerizable compositions comprising at least one hydrophilic amide monomer having one N-vinyl group present in an amount of from 30 to 60 unit parts by weight; HEMA present in an amount of from 10 to 50 unit parts by weight; and a first siloxane monomer component, wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

It has been found that by using the relatively hydrophilic siloxane monomers of formulas (1), (2), and (3) as described herein in combination with particular hydrophilic monomers (specifically, 30 to 60 unit parts by weight of one or more hydrophilic amide monomer having one N-vinyl group, in combination with 10 to 50 unit parts by weight of HEMA), it is possible to prepare miscible polymerizable compositions which comprise both relatively high levels of siloxane monomers (e.g., 15 to 40 unit parts by weight) as well as relatively high levels of the hydrophilic monomers, and that these miscible polymerizable compositions, when reacted, result in polymeric lens bodies having levels of clarity which make them acceptable for use as contact lenses. Additionally, many examples of the polymeric lens bodies formed from the miscible polymerizable compositions as disclosed herein have properties which make them advantageous for us as contact lenses. For example, the polymeric lens bodies can have desirable equilibrium water contents, can have desirable levels of oxygen permeability (Dk), or both. The lens bodies can have properties which are advantageous from a manufacturing standpoint, such as, for example, the ability to cure the polymerizable composition in contact with a molding surface formed from a non-polar material and form wettable polymeric lens bodies without the use of polymeric wetting agents or plasma surface treatments, the ability cure the polymerizable composition under air atmospheres to form polymeric lens bodies which are acceptable for use as contact lenses, the ability to dry demold, or dry delens, or both, the lens bodies, the ability to wash the lens bodies using only washing liquids free of volatile organic solvents, or combinations thereof.

Typically it has been difficult to prepare miscible polymerizable compositions having both relatively high levels of siloxane monomers and of hydrophilic monomers. Without being bound by theory, it is believed that the structures of the siloxane monomers of formula (1), (2) and (3) result in relatively hydrophilic siloxane monomers, making them more compatible with hydrophilic monomers, particularly hydrophilic amide monomers having one N-vinyl group. It has been found that by including these relatively hydrophilic siloxane monomers with relatively high concentrations (e.g., 30-60 unit parts by weight) of one or more hydrophilic amide monomer having one N-vinyl group, it is possible to also include a relatively high concentration (e.g., 10-50 unit parts by weight) of the hydrophilic monomer HEMA and still have a miscible composition which, when polymerized, results in a hydrogel polymer having a level of clarity acceptable for a contact lens material. Additionally, the presence of the relatively high concentration (e.g., 10-50 unit parts by weight) of HEMA in these polymerizable compositions results in the polymeric material being particularly amenable to high-yield manufacturing methods.

A polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

One example of a siloxane monomer of formula (1) is a siloxane monomer represented by formula (1):

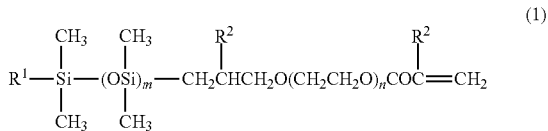

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group. Another example of the siloxane monomer of formula (1) is a siloxane monomer represented by formula (1) wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group and having a number average molecular weight of from 400 to 700 daltons. One particular example of the siloxane monomer of formula (1) is a siloxane monomer represented by formula (1) wherein m of formula (1) is 4, n of formula (1) is 1, $R^1$ of formula (1) is a butyl group, and each $R^2$ of formula (1) is independently either a hydrogen atom or a methyl group. A more particular example of a siloxane monomer of formula (1) is a siloxane monomer represented by formula (1) wherein m of formula (1) is 4, n of formula (1) is 1, $R^1$ of formula (1) is a butyl group, and each $R^2$ of formula (1) is independently either a hydrogen atom or a methyl group and having a number average molecular weight of from 400 to 700 daltons. As used herein, a siloxane monomer of formula (1) is understood to refer to any or all of the siloxane monomers having structures described in this paragraph. The number average molecular weight of the siloxane monomer of formula (1) can be less than 2,000 daltons. In one example, the number average molecular weight of the first siloxane monomer can be less than 1,000 daltons. In another example, the number average molecular weight of the first siloxane monomer can be from 400 to 700 daltons. Additional details of the siloxane monomer of formula (1) can be understood from US20090299022, the entire content of which is hereby incorporated by reference. As can be appreciated from formula (1), the first siloxane monomer has a single methacrylate polymerizable functional group present on one end of the main chain of the siloxane monomer.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1):

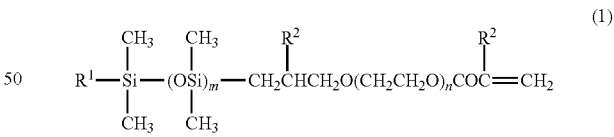

where m of formula (1) is 4, n of formula (1) is 1, $R^1$ of formula (1) is a butyl group, and each $R^2$ of formula (1) is independently either a hydrogen atom or a methyl group; a siloxane monomer of formula (2); a siloxane monomer of formula (3), or any combination thereof.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1):

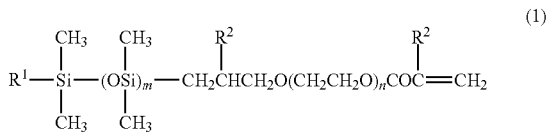

where m of formula (1) is 4, n of formula (1) is 1, $R^1$ of formula (1) is a butyl group, and each $R^2$ of formula (1) is independently either a hydrogen atom or a methyl group, and the siloxane monomer of formula (1) has a number average molecular weight of from 400 to 700 daltons; a siloxane monomer of formula (2); a siloxane monomer of formula (3), or any combination thereof.

The siloxane monomer of formula (1) can be present in the polymerizable composition in an amount of from 15 to 40 unit parts by weight, or of from 20 to 30 unit parts by weight. When the polymerizable composition comprises a single siloxane monomer, the single siloxane monomer can consist of a siloxane monomer of formula (1) in an amount of from 15 to 40 unit parts by weight, or of from 20 to 40 unit parts unit parts by weight, or of from 30 to 40 unit parts by weight. When the polymerizable composition comprises more than one siloxane monomer, the siloxane monomer of formula (1) can be present in an amount of from 1 to 39 unit parts by weight, or of from 3 to 35 unit parts by weight, or of 1 to 15 unit parts by weight, or of from 5 to 30 unit parts by weight, or of from 5 to 15 unit parts, or of from 1 to 6 unit parts by weight.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer of formula (1) present in an amount of from 1 to 39 unit parts by weight, wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer of formula (2) present in an amount of from 1 to 15 unit parts by weight, wherein a total amount of siloxane monomer(s) present in the polymerizable composition is an amount of from 1 to 40 unit parts by weight.

One example of a siloxane of formula (2) is a siloxane monomer represented by formula (2):

where $R^1$ of formula (2) is selected from either hydrogen or a methyl group; $R^2$ of formula (2) is selected from either of hydrogen or a C1-4 hydrocarbon group; m of formula (2) represents an integer of from 0 to 10; n of formula (2) represents an integer of from 4 to 100; a and b of formula (2) represent integers of 1 or more; a+b of formula (2) is equal to 20-500; b/(a+b) is equal to 0.01-0.22, and the configuration of siloxane units includes a random configuration. Another example of a siloxane monomer of formula (2) is a siloxane monomer represented by formula (2) wherein $R^1$ of formula (2) is selected from either hydrogen or a methyl group; $R^2$ of formula (2) is selected from either of hydrogen or a C1-4 hydrocarbon group; m of formula (2) represents an integer of from 0 to 10; n of formula (2) represents an integer of from 4 to 100; a and b of formula (2) represent integers of 1 or more; a+b of formula (2) is equal to 20-500; b/(a+b) is equal to 0.01-0.22, the configuration of siloxane units includes a random configuration, and having a number average molecular weight of at least 7,000 daltons. A particular example of a siloxane monomer of formula (2) is a siloxane monomer represented by formula (2) wherein m of formula (2) is 0, n of formula (2) is an integer from 5 to 15, a is an integer from 65 to 90, b is an integer from 1 to 10, $R^1$ of formula (2) is a methyl group, and $R^2$ of formula (2) is either a hydrogen atom or a hydrocarbon group having 1 to 4 carbon atoms, a and b of formula (2) represent integers of 1 or more; a+b of formula (2) is equal to 20-500; b/(a+b) is equal to 0.01-0.22, and the configuration of siloxane units includes a random configuration. A more particular example of a siloxane monomer of formula (2) is a siloxane monomer represented by formula (2) wherein m of formula (2) is 0, n of formula (2) is an integer from 5 to 15, a is an integer from 65 to 90, b is an integer from 1 to 10, $R^1$ of formula (2) is a methyl group, and $R^2$ of formula (2) is either a hydrogen atom or a hydrocarbon group having 1 to 4 carbon atoms, a and b of formula (2) represent integers of 1 or more; a+b of formula (2) is equal to 20-500; b/(a+b) is equal to 0.01-0.22, the configuration of siloxane units includes a random configuration and having a number average molecular weight of at least 7,000 daltons. As used herein, a siloxane monomer of formula (2) is understood to refer to any or all of the siloxane monomers having structures described in this paragraph. The number average molecular weight of the siloxane monomer of formula (2) can be from 9,000 to 10,000 daltons. In another example, the siloxane monomer of formula (2) can have a number average molecular weight of from 5,000 to 20,000 daltons, or of from 5,000 to 10,000 daltons. It can be appreciated that the siloxane of formula (2) is a bifunctional siloxane having two terminal methacrylate polymerizable functional groups (i.e., a methacrylate group present on each end of the main siloxane chain of the molecule). Additional details of the siloxane monomer of formula (2) can be found in US20090234089, the entire content of which is incorporated herein by reference.

One example of a polymerizable composition in accordance with the present disclosure is a miscible polymerizable

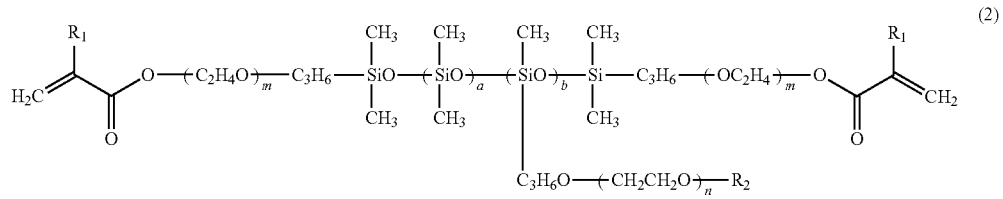

composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1); a siloxane monomer of formula (2):

siloxane monomer, the single siloxane monomer can consist of a siloxane monomer of formula (2) in an amount of from 15 to 40 unit parts by weight, or of from 20 to 40 unit parts unit parts by weight, or of from 30 to 40 unit parts by weight. When the polymerizable composition comprises more than one siloxane monomer, the siloxane monomer of formula (2) can be present in an amount of from 1 to 39 unit parts by weight, or of from 1 to 15 unit parts by weight, or of from 3 to 35 unit parts by weight, or of from 5 to 30 unit parts by weight,

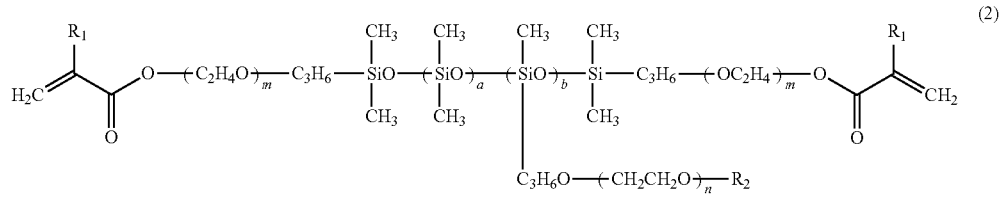

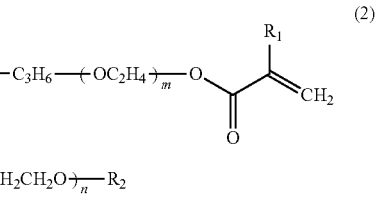

where R1 of formula (2) is selected from either hydrogen or a methyl group; R2 of formula (2) is selected from either of hydrogen or a C1-4 hydrocarbon group; m of formula (2) represents an integer of from 0 to 10; n of formula (2) represents an integer of from 4 to 100; a and b of formula (2) represent integers of 1 or more; a+b of formula (2) is equal to 20-500; b/(a+b) is equal to 0.01-0.22, and the configuration of siloxane units includes a random configuration; a siloxane monomer of formula (3); or any combination thereof.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1); a siloxane monomer of formula (2):

or of from 5 to 15 unit parts, or of from 1 to 6 unit parts by weight.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer of formula (2) present in an amount of from 1 to 39 unit parts by weight, wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer of formula (2) present in an amount of from 1 to 15 unit parts by weight, wherein a total amount of

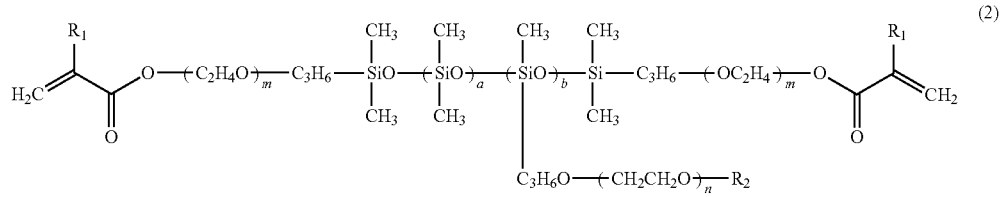

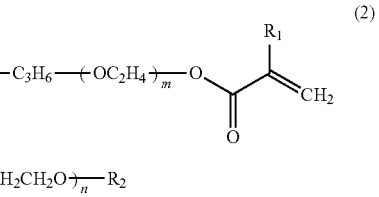

where m of formula (2) is 0, n of formula (2) is an integer from 5 to 15, a is an integer from 65 to 90, b is an integer from 1 to 10, $R^1$ of formula (2) is a methyl group, and $R^2$ of formula (2) is either a hydrogen atom or a hydrocarbon group having 1 to 4 carbon atoms; a and b of formula (2) represent integers of 1 or more; a+b of formula (2) is equal to 20-500; b/(a+b) is equal to 0.01-0.22, and the configuration of siloxane units includes a random configuration; a siloxane monomer of formula (3); or any combination thereof.

The siloxane monomer of formula (2) can be present in the polymerizable composition in an amount of from 15 to 40 unit parts by weight, or of from 20 to 30 unit parts by weight. When the polymerizable composition comprises a single siloxane monomer(s) present in the polymerizable composition is an amount of from 15 to 40 unit parts by weight.

One example of a siloxane monomer of formula (3) is a siloxane monomer represented by formula (3):

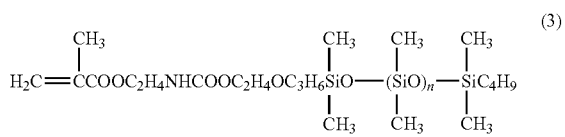

wherein n of formula (3) is an integer from 0-30. In one example, n of formula (3) can be an integer from 10-16. In another example, n of formula (3) can be an integer from 13-16. In another example, n of formula (3) can be an integer from 12-13. In yet another example, the siloxane monomer of formula (3) can have a number average molecular weight of from 1,000 to 2,000 daltons. In a particular example, the siloxane monomer of formula (3) can be a siloxane monomer of formula (3) where n of formula (3) is 13-16 which has a molecular weight of about 1,500 daltons. As used herein, a siloxane monomer of formula (3) is understood to refer to any or all of the siloxane monomers having structures described in this paragraph. Such monofunctional siloxane monomers of formula (3) are described in U.S. Pat. No. 6,867,245, which is hereby incorporated by reference.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1); a siloxane monomer of formula (2); a siloxane monomer of formula (3):

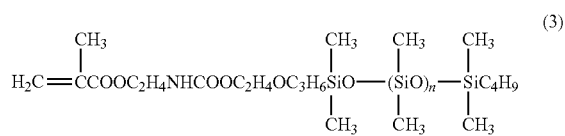

where n of formula (3) is an integer from 0-30; or any combination thereof.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1); a siloxane monomer of formula (2); a siloxane monomer of formula (3):

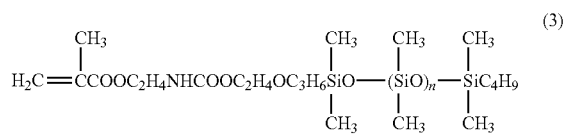

where n of formula (3) is 13-16 and the siloxane monomer of formula (3) has a molecular weight of about 1,500 daltons; or any combination thereof.

The siloxane monomer of formula (3) can be present in the polymerizable composition in an amount of from 15 to 40 unit parts by weight, or of from 20 to 30 unit parts by weight. When the polymerizable composition comprises a single siloxane monomer, the single siloxane monomer can consist of a siloxane monomer of formula (3) in an amount of from 15 to 40 unit parts by weight, or of from 20 to 40 unit parts unit parts by weight, or of from 30 to 40 unit parts by weight. When the polymerizable composition comprises more than one siloxane monomer, the siloxane monomer of formula (3) can be present in an amount of from 1 to 39 unit parts by weight, or of from 1 to 15 unit parts by weight, or of from 3 to 35 unit parts by weight, or of from 5 to 30 unit parts by weight, or of from 5 to 15 unit parts, or of from 1 to 6 unit parts by weight.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer of formula (3) present in an amount of from 1 to 39 unit parts by weight, wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer of formula (3) present in an amount of from 1 to 15 unit parts by weight, wherein a total amount of siloxane monomer(s) present in the polymerizable composition is an amount of from 15 to 40 unit parts by weight.

The present contact lenses comprise, or consist of, hydrated lens bodies comprising a polymeric component and a liquid component. The polymeric component comprises units of one or more siloxane monomers (i.e., one or more siloxanes of formula (1), formula (2), or formula (3) present as a first siloxane component, and optionally a second or more siloxane monomer or monomer component), units of the at least one hydrophilic amide monomer having one N-vinyl group, and units of HEMA. It can therefore be understood that the polymeric component is the reaction product of a polymerizable composition comprising one or more hydrophilic amide monomers having one N-vinyl group, HEMA, and one or more siloxane monomers (a single siloxane monomer or two or more siloxane monomers present in the first siloxane monomer component of the composition, and optionally additional siloxane monomers which may be present), and optionally one or more non-silicon reactive ingredients. As used herein, a non-silicon reactive ingredient is understood to be an ingredient which has a polymerizable double bond as part of its molecular structure, but which does not have a silicon atom in its molecular structure. The ingredients of the polymerizable composition can be monomers, macromers, pre-polymers, polymers, or any combination thereof. Optionally, the ingredients of the polymerizable composition can further comprise at least one cross-linking agent, or at least one additional non-silicon monomer, or any combination thereof. These optional ingredients are understood to be silicon-free polymerizable ingredients. As used herein, the at least one cross-linking agent can be understood to comprise a single cross-linking agent, or to comprise a cross-linking agent component composed of two or more cross-linking agents. Similarly, the optional at least one additional non-silicon monomer can be understood to comprise a single non-silicon monomer, or to comprise a non-silicon monomer component composed of two or more non-silicon monomers. Examples of additional non-silicon monomers can include hydrophilic monomers as well as hydrophobic monomers. Additionally, the polymerizable composition can optionally include at least one initiator, or at least one organic diluent, or at least one surfactant, or at least one oxygen scavenger, or at least one tinting agent, or at least one UV absorber, or at least one chain transfer agent, or any combination thereof. The optional at least one initiator, at least one organic diluent, at least one surfactant, at least one oxygen scavenger, at least one tinting agent, at least one UV absorber, or at least one chain transfer agent are understood to be non-silicon ingredients, and can be either non-polymerizable ingredients or polymerizable ingredients (i.e., ingredients having a polymerizable functional group as part of their molecular structure).

Organic diluents that can optionally be included in the present polymerizable compositions include alcohols, including lower alcohols, such as, for example, without limitation, pentanol, or hexanol, or octanol, or decanol, or any combination thereof. When included, the organic diluent or organic diluent component can be provided in the polymerizable composition in an amount from about 1 to about 70 unit parts, or from about 2 unit parts to about 50 unit parts, or from about 5 unit parts to about 30 unit parts.

The combination of the polymeric component and the liquid component are present as a hydrated lens body, which is suitable for placement on an eye of a person. The hydrated lens body has a generally convex anterior surface and a generally concave posterior surface, and has an equilibrium water content (EWC) greater than 10% weight by weight (wt/wt). Thus, the present contact lenses can be understood to be soft contact lenses, which as used herein, refers to contact lenses that, when fully hydrated, can be folded upon themselves without breaking.

As understood in the industry, a daily disposable contact lens is an unworn contact lens that is removed from its sealed, sterilized package (primary package) produced by a contact lens manufacturer, placed on a person's eye, and is removed and discarded after the person is done wearing the lens at the end of the day. Typically, the duration of lens wear for daily disposable contact lenses is from eight to fourteen hours, and they are then disposed of after wear. Daily disposable lenses are not cleaned or exposed to cleaning solutions prior to placement in the eye since they are sterile prior to opening the package. A daily disposable silicone hydrogel contact lens is a disposable silicone hydrogel contact lens that is replaced daily. In contrast, non-daily disposable contact lenses are disposable contact lenses that are replaced less frequently than daily (e.g., weekly, bi-weekly, or monthly). Non-daily disposable contact lenses are either removed from the eye and cleaned with a cleaning solution on a regular basis, or are worn continuously without removal from the eye. The present contact lenses can be either daily disposable contact lenses or non-daily disposable contact lenses.

The present disclosure is directed to silicone hydrogel contact lenses, batches of silicone hydrogel contact lenses, as well as methods of manufacturing silicone hydrogel contact lenses, all of which involve reacting the polymerizable compositions of the present disclosure to form polymeric lens bodies.

One example of a silicone hydrogel contact lens in accordance with the present disclosure is a silicone hydrogel contact lens, comprising: an ophthalmically acceptably clear polymeric lens body, the polymeric lens body being the reaction product of a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

One example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body; contacting the polymeric lens body with a washing liquid to remove extractable material from the polymeric lens body; and packaging the polymeric lens body in a contact lens packaging solution in a contact lens package.

As described herein, the present polymerizable compositions comprise at least one hydrophilic amide monomer having one N-vinyl group. Examples of hydrophilic amide monomers having one N-vinyl group include N-vinyl formamide, or N-vinyl acetamide, or N-vinyl-N-ethyl acetamide, or N-vinyl isopropylamide, or N-vinyl-N-methyl acetamide (VMA), or N-vinyl pyrrolidone (NVP), or N-vinyl caprolactam, or any combination thereof. In one example, the at least one hydrophilic amide monomer having one N-vinyl group can comprise or consist of N-vinyl-N-methyl acetamide (VMA), or N-vinyl pyrrolidone (NVP), or both. In another example, the at least one hydrophilic monomer having one N-vinyl group can comprise or consist of VMA. In another example, the at least one hydrophilic monomer having one N-vinyl group can comprise or consist of NVP.

One example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) VMA in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) NVP in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

The at least one hydrophilic amide monomer having one N-vinyl group is present in the polymerizable composition in an amount of from 30 to 60 unit parts by weight. In one example, the at least one hydrophilic amide monomer having one N-vinyl group can be present in an amount of from 30 to 50 unit parts by weight, or of from about 30 to about 40 unit parts by weight.

One example of a polymerizable composition in accordance with the present disclosure is a miscible polymerizable composition comprising (a) VMA, or NVP, or both, in an amount of from about 30 to about 40 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) VMA in an amount of from about 30 to about 40 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) NVP in an amount of from about 30 to about 40 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

In one example, the ingredients of the polymerizable composition can be present in amounts such that the resulting silicone hydrogel contact lens has, when fully hydrated, an equilibrium water content (EWC) from about 30% wt/wt to about 70% wt/wt, such as, for example, from about 45% wt/wt to about 65% wt/wt or from about 50% wt/wt to about 67% wt/wt, or from about 50% to about 63%, or from about 55% wt/wt to about 65% wt/wt. An example of such a polymerizable composition is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; wherein the ingredients of the polymerizable composition are present in amounts such that a silicone hydrogel contact lens formed from the polymerizable composition has, when fully hydrated, an equilibrium water content (EWC) from about 30% wt/wt to about 70% wt/wt.

When the polymerizable composition comprises a first siloxane monomer in combination with a second siloxane monomer, the first siloxane monomer and the second siloxane monomer can be present in the polymerizable composition in a ratio of at least 1:1 based on unit parts by weight. In one example, the first siloxane monomer and the second siloxane monomer can be present in a ratio of at least 2:1 based on unit parts. The second siloxane monomer can have more than one polymerizable functional group (i.e., the second siloxane monomer can be a multifunctional siloxane monomer) and can have a number average molecular weight of at least 3,000 daltons. If the second siloxane monomer has two polymerizable functional groups, such as two methacrylate groups, it is a bifunctional monomer. If the second siloxane monomer has three polymerizable functional groups, it is a trifunctional monomer.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component comprising a first siloxane monomer and a second siloxane monomer, the first siloxane monomer and the second siloxane monomer being selected from a siloxane monomer of formula (1), a siloxane monomer of formula (2), and a siloxane monomer of formula (3); wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component comprising a first siloxane monomer and a second siloxane monomer, the first siloxane monomer and the second siloxane monomer being selected from a siloxane monomer of formula (1), a siloxane monomer of formula (2), and a siloxane monomer of formula (3); wherein a total amount of siloxane monomer(s) present in the polymerizable composition is an amount of from 15 to 40 unit parts by weight; and the first siloxane monomer and the second siloxane monomer are present in the polymerizable composition in a ratio of at least 2:1 based on unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component comprising a first siloxane monomer selected from a siloxane monomer of formula (1), a siloxane monomer of formula (2), and a siloxane monomer of formula (3); and (d) a second siloxane monomer; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component comprising a first siloxane monomer selected from a siloxane monomer of formula (1), a siloxane monomer of formula (2), and a siloxane monomer of formula (3); and (d) a second siloxane monomer; wherein a total amount of siloxane monomer(s) present in the polymerizable composition is an amount of from 15 to 40 unit parts by weight; and the first siloxane monomer and the second siloxane monomer are present in the polymerizable composition in a ratio of at least 2:1 based on unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component comprising a first siloxane monomer selected from a siloxane monomer of formula (1), a siloxane monomer of formula (2), and a siloxane monomer of formula (3); and (d) a second siloxane monomer selected from 3-[tris(trimethylsilyloxy)silyl]propyl methacrylate (TRIS) or MCS-M11; wherein a total amount of siloxane monomer(s) present in the polymerizable composition is an amount of from 15 to 40 unit parts by weight.

Yet another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component comprising a first siloxane monomer selected from a siloxane monomer of formula (1), a siloxane monomer of formula (2), and a siloxane monomer of formula (3); and (d) a second siloxane monomer selected from 3-[tris(trimethylsilyloxy)silyl]propyl methacrylate (TRIS) or MCS-M11; wherein a total amount of siloxane monomer(s) present in the polymerizable composition is an amount of from 15 to 40 unit parts by weight; and the first siloxane monomer and the second siloxane monomer are present in the polymerizable composition in a ratio of at least 2:1 based on unit parts by weight.

When the polymerizable composition comprises at least one cross-linking agent, the first siloxane monomer component and the at least one cross-linking agent (i.e., a single cross-linking agent or a cross-linking agent component composed of two or more cross-linking agents) can be present in the polymerizable composition in a ratio of at least 10:1 based on the total unit parts by weight of the first siloxane monomer component to the total unit parts by weight of the at least one cross-linking agent (i.e., the sum of the unit parts of all vinyl-containing cross-linking agents present in the polymerizable composition). For example, the ratio can be at least 25:1 or at least 50:1 or at least 100:1 based on unit parts by weight.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component; and (d) at least one cross-linking agent; wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

In one example, the at least one cross-linking agent can comprise at least one vinyl-containing cross-linking agent, and at least one acrylate or methacrylate-containing cross-linking agent. In another example, the at least one cross-linking agent can consist of only one or more vinyl-containing cross linking agents. In another example, the at least one cross-linking agent can comprise or consist of at least one vinyl ether-containing cross-linking agent. In another example, the at least one cross-linking agent can consist of only one or more vinyl-containing cross linking agents. In yet another example, the at least one cross-linking agent can comprise or consist of at least one vinyl ether-containing cross-linking agent.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component and (d) at least one cross-linking agent having at least one vinyl polymerizable functional group present in its molecular structure; wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

In one example, the at least one cross-linking agent can comprise or consist of a cross-linking agent having at least one acrylate or methacrylate polymerizable functional group in its molecular structure. In another example, the at least one cross-linking agent can comprise or consist of a cross-linking agent having at least one vinyl polymerizable functional group and at least one acrylate or methacrylate polymerizable functional group in its molecular structure. In yet another example, the at least one cross-linking agent can comprise or consist of a first cross-linking agent having only acrylate or methacrylate polymerizable functional groups in its molecular structure, and a second cross-linking agent having at least one vinyl polymerizable functional group and at least one acrylate or methacrylate polymerizable functional group in its molecular structure.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component and (d) at least one cross-linking agent having at least one acrylate or methacrylate polymerizable functional group in its molecular structure; wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component; and (d) a cross-linking agent component comprising at least one cross-linking agent having at least one vinyl polymerizable functional group in its molecular structure, and at least one cross-linking agent having at least one acrylate or methacrylate polymerizable functional group in its molecular structure; wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Typically it has been difficult to prepare miscible polymerizable compositions having relatively high amounts of siloxanes in combination with high concentrations of hydrophilic monomers, particularly when a higher molecular weight silicone monomer (e.g., a monomer having a number average molecular weight of at least 3,000 daltons) is present in the composition. Without being bound by theory, it is believed that the structure of the siloxanes of formula (1), (2) or (3), particularly when one of the siloxanes of formula (1), (2) or (3) either is itself a high molecular weight siloxane and/or is combined with a second siloxane having a high molecular weight (either as part of the first siloxane monomer composition, or in combination with a second siloxane monomer component), may allow miscible polymerizable compositions containing relatively high concentrations of one or more hydrophilic amide monomer having one N-vinyl group and of HEMA to be prepared. The total amount of siloxane monomer(s) present in the polymerizable composition can be an amount from 15 to 40 unit parts unit parts by weight, such as, for example, from 20 to 40 unit parts by weight, or from about 30 to about 40 unit parts by weight.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 20 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from about 30 to about 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprises at least one siloxane monomer selected from a siloxane monomer of formula (1), a siloxane monomer of formula (2), a siloxane monomer of formula (3), or any combination thereof, and the polymerizable composition comprises at least one siloxane monomer having a number average molecular weight of at least 3,000 daltons.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprises at least one siloxane monomer selected from a siloxane monomer of formula (1), a siloxane monomer of formula (2), a siloxane monomer of formula (3), or any combination thereof, and the polymerizable composition comprises at least one siloxane monomer having a number average molecular weight of at least 7,000 daltons.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer of formula (1), wherein a total amount of siloxane monomer(s) present in the polymerizable composition is an amount of from 15 to 40 unit parts by weight, and the polymerizable composition comprises at least one siloxane monomer having a number average molecular weight of at least 7,000 daltons.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer of formula (1) present in an amount of from 15 to 35 unit parts by weight, wherein a total amount of siloxane monomer(s) present in the polymerizable composition is an amount of from 20 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer of formula (1) having a number average molecular weight of from 400 to 700 daltons present in an amount of from 15 to 35 unit parts by weight, wherein a total amount of siloxane monomer(s) present in the polymerizable composition is an amount of from 20 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer of formula (1) present in an amount of from 15 to 35 unit parts by weight, wherein a total amount of siloxane monomer(s) present in the polymerizable composition is an amount of from 20 to 40 unit parts by weight, and the polymerizable composition comprises at least one siloxane monomer having a number average molecular weight of at least 7,000 daltons.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer of formula (2) present in an amount of from 5 to 15 unit parts by weight, wherein a total amount of siloxane monomer(s) present in the polymerizable composition is an amount of from 20 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer of formula (2) having a number average molecular weight of at least 7,000 daltons present in an amount of from 5 to 15 unit parts by weight, wherein a total amount of siloxane monomer(s) present in the polymerizable composition is an amount of from 20 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer of formula (3) present in an amount of from 15 to 35 unit parts by weight, wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer of formula (3) having a number average molecular weight of about 1,500 daltons present in an amount of from 15 to 35 unit parts by weight, wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer of formula (3) present in an amount of from 15 to 35 unit parts by weight, wherein a total amount of siloxane monomer(s) present in the polymerizable composition is an amount of from 15 to 40 unit parts by weight, and the polymerizable composition comprises at least one siloxane monomer having a number average molecular weight of at least 7,000 daltons.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer of formula (3), wherein a total amount of siloxane monomer(s) present in the polymerizable composition is an amount of from 15 to 40 unit parts by weight, and the polymerizable composition comprises at least one siloxane monomer having a number average molecular weight of at least 7,000 daltons.

Yet another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprises at least one siloxane monomer selected from a siloxane monomer of formula (1), a siloxane monomer of formula (2), a siloxane monomer of formula (3), or any combination thereof, and the polymerizable composition comprises at least one siloxane monomer of formula (2) having a number average molecular weight of at least 7,000 daltons.

Similarly, the addition of one or more highly hydrophilic monomers to polymerizable compositions comprising relatively high concentrations of siloxane monomers has been observed to frequently have detrimental effects on the miscibility of the polymerizable compositions and of the clarity of the resulting silicone hydrogel contact lenses. Without being bound by theory, it is believed that the structure of the siloxane monomers of formula (1), (2) and (3), particularly when one or more of these siloxane monomers is combined with relatively high concentrations of at least one hydrophilic amide monomer having one N-vinyl group in combination with HEMA, is particularly favorable for the production miscible polymerizable compositions which, when reacted, produce silicone hydrogel contact lenses having acceptable clarity. The total amount of hydrophilic amide monomers having one N-vinyl group present in the polymerizable composition can be from 30 to 60 unit parts by weight, or from 30 to 50 unit parts by weight, or from about 30 to about 45 unit parts by weight. The total amount of HEMA present in the polymerizable composition can be from 10 to 50 unit parts by weight, or from 15 to 45 unit parts by weight, or from about 25 to about 35 unit parts by weight.

One example of a polymerizable composition in accordance with the present disclosure is a miscible polymerizable composition comprising (a) at least one hydrophilic amide monomer having one N-vinyl group present in an amount of from 30 to 50 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) at least one hydrophilic amide monomer having one N-vinyl group present in an amount of from about 30 to about 45 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) at least one hydrophilic amide monomer having one N-vinyl group present in an amount of from about 30 to about 45 unit parts by weight; (b) HEMA present in an amount of from 10 to 45 unit parts by weight; and (c) a first siloxane monomer component, wherein a total amount of siloxane monomer(s) present in the polymerizable composition is an amount of from 15 to 45 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) at least one hydrophilic amide monomer having one N-vinyl group present in an amount of from about 30 to about 45 unit parts by weight; (b) HEMA present in an amount of from about 20 to about 40 unit parts by weight; and (c) a first siloxane monomer component, wherein a total amount of siloxane monomer(s) present in the polymerizable composition is an amount of from about 20 to about 40 unit parts by weight, and the first siloxane monomer component comprises at least one siloxane monomer selected from a siloxane monomer of formula (1), a siloxane monomer of formula (2), a siloxane monomer of formula (3), or any combination thereof.

The miscible polymerizable composition disclosed herein can be miscible when initially prepared, and can remain miscible over a period of time adequate for the commercial manufacture of contact lenses, such as, for example, for about 2 weeks, or about 1 week, or about 5 days. Typically, when polymerized and processed into contact lenses, miscible polymerizable compositions result in contact lenses having ophthalmically acceptable clarities.

Approaches commonly employed to increase the miscibility of siloxane monomers and hydrophilic monomers include adding organic diluents to the polymerizable composition to act as compatiblizers between the hydrophilic monomers and the siloxane monomers which typically are more hydrophobic, or using only siloxane monomers having low molecular weights (e.g., molecular weights below 2500 daltons). In one example where the polymerizable composition comprises an optional second siloxane monomer, the use of polymerizable compositions as described herein makes it possible to include an optional high molecular weight siloxane monomer, either as part of the first siloxane monomer component, as a second siloxane, or as part of a second siloxane monomer component in the polymerizable composition. And while it is possible to include one or more organic diluents in the present polymerizable compositions disclosed herein, it may not be necessary to do so in order to obtain a miscible polymerizable composition in accordance with the present disclosure. In other words, in one example, the polymerizable compositions of the present disclosure can be free of an organic diluent.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component; wherein the polymerizable composition is free of an organic diluent, a total amount of siloxane monomer(s) present in the polymerizable composition is an amount of from 15 to 40 unit parts by weight; the first siloxane monomer component comprises at least one siloxane monomer selected from a siloxane monomer of formula (1), a siloxane monomer of formula (2), a siloxane monomer of formula (3), or any combination thereof; and the siloxane monomer of formula (1) is present in the polymerizable composition in an amount of from 0 to 40 unit parts by weight, or the siloxane monomer of formula (2) is present in the polymerizable composition in an amount of 7 unit parts by weight or less, or the siloxane monomer of formula (3) is present in the polymerizable composition in an amount of from 0 to 40 unit parts by weight, or any combination thereof.

However, when higher molecular weight siloxane monomers are used, it may be necessary to include one or more organic diluents in the present polymerizable compositions. For example, an organic diluent can be included in the polymerizable composition when a siloxane monomer having a number average molecular weight of at least 3,000 daltons is present in the polymerizable composition, or when a siloxane monomer having a number average molecular weight of at least 5,000 daltons is present in the polymerizable composition, or when a siloxane monomer having a number average molecular weight of at least 7,000 daltons is present in the polymerizable composition.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component, and (d) at least one organic diluent; wherein a total amount of siloxane monomer(s) present in the polymerizable composition is an amount of from 15 to 40 unit parts by weight; the first siloxane monomer component comprises at least one siloxane monomer selected from a siloxane monomer of formula (1), a siloxane monomer of formula (2), a siloxane monomer of formula (3), or any combination thereof; and the polymerizable composition comprises at least one siloxane monomer having a number average molecular weight of at least 7,000 daltons.

An organic diluent can be included in the polymerizable composition when more than 7 unit parts by weight of a siloxane having a number average molecular weight of at least 3,000 daltons, or of at least 5,000 daltons, or of at least 7,000 daltons is present in the polymerizable composition.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component, and (d) at least one organic diluent; wherein a total amount of siloxane monomer(s) present in the polymerizable composition is an amount of from 15 to 40 unit parts by weight; the first siloxane monomer component comprises at least one siloxane monomer selected from a siloxane monomer of formula (1), a siloxane monomer of formula (2), a siloxane monomer of formula (3), or any combination thereof; and the polymerizable composition comprises at least 7 unit parts by weight of a siloxane monomer having a number average molecular weight of at least 7,000 daltons.

An organic diluent can be included in the polymerizable composition when a siloxane monomer having one or more urethane linkages and having a number average molecular weight of at least 3,000 daltons, or of at least 5,000 daltons, or of at least 7,000 daltons is present in the polymerizable composition.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component, and (d) at least one organic diluent; wherein a total amount of siloxane monomer(s) present in the polymerizable composition is an amount of from 15 to 40 unit parts by weight; the first siloxane monomer component comprises at least one siloxane monomer selected from a siloxane monomer of formula (1), a siloxane monomer of formula (2), a siloxane monomer of formula (3), or any combination thereof; and the polymerizable composition comprises at least one siloxane monomer with a urethane linkage, the at least one siloxane monomer having a number average molecular weight of at least 7,000 daltons.

An organic diluent can be included in the polymerizable composition when a siloxane monomer of formula (2), or a siloxane monomer of formula (2) which has a number average molecular weight of at least 3,000 daltons, or a siloxane monomer of formula (2) which has a number average molecular weight of at least 5,000 daltons, or a siloxane monomer of formula (2) which has a number average molecular weight of at least 7,000 daltons is present in the polymerizable composition.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component, and (d) at least one organic diluent; wherein a total amount of siloxane monomer(s) present in the polymerizable composition is an amount of from 15 to 40 unit parts by weight; and the first siloxane monomer component comprises at least one siloxane monomer of formula (2) alone or in combination with a siloxane monomer of formula (1) or a siloxane monomer of formula (3), or both.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component, and (d) at least one organic diluent; wherein a total amount of siloxane monomer(s) present in the polymerizable composition is an amount of from 15 to 40 unit parts by weight; the first siloxane monomer component comprises at least one siloxane monomer of formula (2) alone or in combination with a siloxane monomer of formula (1) or a siloxane monomer of formula (3), or both; and the polymerizable composition comprises at least 7 unit parts by weight of the siloxane monomer of formula (2).

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component, and (d) at least one organic diluent; wherein a total amount of siloxane monomer(s) present in the polymerizable composition is an amount of from 15 to 40 unit parts by weight; the first siloxane monomer component comprises at least one siloxane monomer of formula (2) alone or in combination with a siloxane monomer of formula (1) or a siloxane monomer of formula (3), or both; and the polymerizable composition comprises at least 7 unit parts by weight of a siloxane monomer of formula (2) having a number average molecular weight of at least 7,000 daltons.

As used herein, a molecular weight is understood to refer to the number average molecular weight. The number average molecular weight is the ordinary arithmetic mean or average of the molecular weights of the individual molecules present in the sample of a monomer. As the individual molecules in a sample of monomer may vary slightly from one another in molar mass, some level of polydispersity may be present in the sample. As used herein, when the siloxane monomer, or any other monomer, macromer, pre-polymer, or polymer, of the polymerizable composition is polydisperse, the term "molecular weight" refers to the number average molecular weight of the monomer or ingredient. As one example, a sample of the siloxane monomer can have a number average molecular weight of about 15,000 daltons, but if the sample is polydisperse, the actual molecular weights of the individual monomers present in the sample may range from 12,000 daltons to 18,000 daltons.

The number average molecular weight can be the absolute number average molecular weight as determined by proton nuclear magnetic resonance (NMR) end group analysis, as understood by persons of ordinary skill in the art. Molecular weights may also be determined using gel permeation chromatography, as understood by persons of ordinary skill in the art, or may be provided by suppliers of the chemicals.

As previously described, the miscible polymerizable compositions of the present invention comprise (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof. The polymerizable compositions can also include additional optional ingredients. For example, the polymerizable composition can optionally include at least one additional hydrophilic monomer. The polymerizable composition can optionally include at least one additional hydrophobic monomer. The polymerizable composition can optionally include a second siloxane monomer or monomer component, or at least one third siloxane monomer. In such an example, it is understood that the second siloxane monomer, all the components of the second siloxane monomer component, and the at least one third siloxane monomer have a different molecular structure, a different molecular weight, or both a different molecular structure and a different molecular weight than the component(s) of the first siloxane monomer component.

The first siloxane monomer component, and, when present, the optional second siloxane monomer or monomer component and the at least one third siloxane monomer, comprise the siloxane monomer component of the polymerizable composition. Each component of the first siloxane monomer component, or the optional second siloxane monomer or monomer component, or the optional at least one third siloxane monomer, or any combination thereof, can be a hydrophilic siloxane monomer, or a hydrophobic siloxane monomer, or can have both hydrophilic regions and hydrophobic regions, depending on the amount and location of any hydrophilic components, such as units of ethylene glycol, polyethylene glycol and the like, present in the molecular structure of the siloxane monomers.

The hydrophilicity or hydrophobicity of a monomer can be determined using conventional techniques, such as, for example, based on the monomer's aqueous solubility. For purposes of the present disclosure, a hydrophilic monomer is a monomer that is visibly soluble in an aqueous solution at room temperature (e.g. about 20-25 degrees C.). For example, a hydrophilic monomer can be understood to be any monomer for which 50 grams or more of the monomer are visibly fully soluble in 1 liter of water at 20 degrees C. (i.e., the monomer is soluble at a level of at least 5% wt/wt in water) as determined using a standard shake flask method as known to persons of ordinary skill in the art. A hydrophobic monomer, as used herein, is a monomer that is visibly insoluble in an aqueous solution at room temperature, such that separate, visually identifiable phases are present in the aqueous solution, or such that the aqueous solution appears cloudy and separates into two distinct phases over time after sitting at room temperature. For example, a hydrophobic monomer can be understood to be any monomer for which 50 grams of the monomer are not visibly fully soluble in 1 liter of water at 20 degrees C. (i.e., the monomer is soluble at a level of less than 5% wt/wt in water).

In one example of the present disclosure, the optional second siloxane monomer or monomer component or at least one third siloxane monomer of the polymerizable composition can be a multifunctional siloxane monomer. If the second siloxane monomer has two functional groups, such as two methacrylate groups, it is a bifunctional monomer. If the second siloxane monomer has three functional groups, it is a trifunctional monomer.

The optional second siloxane monomer or monomer component or at least one third siloxane monomer can be a siloxane monomer having a polymerizable functional group present on one end of the main chain of the monomer. The second siloxane monomer can be a siloxane monomer having a polymerizable functional group on both ends of the main chain of the monomer. The second siloxane monomer can be a siloxane monomer having a polymerizable functional group present on at least one side chain of the monomer. The second siloxane monomer can be a siloxane monomer having a polymerizable functional group present on only one side chain of the monomer.

The optional second siloxane monomer or monomer component or at least one third siloxane monomer of the polymerizable composition can be an acrylate-containing siloxane monomer, in other words, a siloxane monomer having at least one acrylate polymerizable functional group as part of its molecular structure. In one example, the acrylate-containing siloxane monomer can be a methacrylate-containing siloxane monomer, i.e., a siloxane monomer having at least one methacrylate polymerizable functional group as part of its molecular structure.

The optional second siloxane monomer or second siloxane monomer component or at least one third siloxane monomer can include poly(organosiloxane) monomers or macromers or prepolymers, such as, for example, 3-[tris(trimethylsiloxy)silyl]propyl allyl carbamate, or 3-[tris(trimethylsiloxy)silyl]propyl vinyl carbamate, or trimethylsilylethyl vinyl carbonate, or trimethylsilylmethyl vinyl carbonate, or 3-[tris(trimethylsilyloxy)silyl]propyl methacrylate (TRIS), or 3-methaycryloxy-2-hydroxypropyloxy)propylbis(trimethylsiloxy)methylsilane (SiGMA), or methyldi(trimethylsiloxy)silylpropylglycerolethyl methacrylate (SiGEMA), or monomethacryloxypropyl terminated polydimethylsiloxane (MCS-M11), MCR-M07, or monomethacryloxypropyl terminated mono-n-butyl terminated polydimethyl siloxane (mPDMS), or any combination thereof. In one example of a polymerizable composition of the present disclosure, the optional second siloxane monomer or at least one third siloxane can comprise one or more of the first siloxanes described herein, wherein the second siloxane monomer or at least one third siloxane differs from the first siloxane present in the polymerizable composition based on molecular weight, molecular structure, or both molecular weight and structure. For example, the optional second siloxane monomer or at least one third siloxane monomer can be a siloxane monomer of formula (1) having a different molecular weight than the first siloxane monomer of the polymerizable composition. In another example, the optional second siloxane monomer or at least one third siloxane can comprise at least one of the siloxanes disclosed in the following patents: US2007/0066706, US2008/0048350, U.S. Pat. Nos. 3,808,178, 4,120, 570, 4,136,250, 4,153,641, 470,533, 5,070,215, 5,998,498, 5,760,100, 6,367,929, and EP080539, the entire content of which are hereby incorporated by reference.

As another example of a bifunctional siloxane monomer useful in the present silicone hydrogel contact lenses, the optional second siloxane monomer or at least one third siloxane monomer can be represented by formula (5):

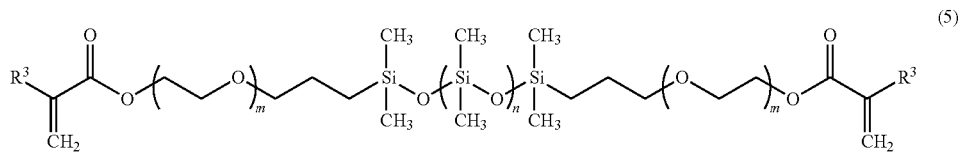

(5)

wherein each $R^3$ is independently selected from either a hydrogen atom or a methyl group, m of formula (5) represents an integer from 0 to 10, and n of formula (5) represents an integer from 1 to 500. In one example, the second siloxane monomer is represented by formula (5), and each $R^3$ is a methyl group, m of formula (5) is 0, and n of formula (5) is one integer from 40 to 60.

In another example, the optional second siloxane monomer or at least one third siloxane monomer can be a bifunctional siloxane monomer represented by formula (6), and is abbreviated Si3 in Examples 1-25 (available from Gelest, Inc., Morrisville, Pa. as product code DMS-R18):

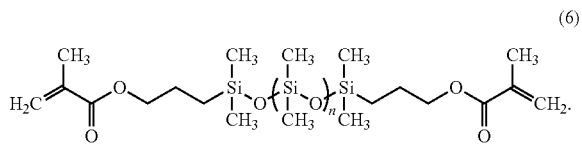

(6)

In one example, the siloxane of formula (6) has a number average molecular weight from about 4,000 to about 4,500 daltons.

Yet another example of a siloxane monomer which can be used as the optional second siloxane monomer or at least one third siloxane monomer can include bifunctional siloxane monomers having at least two urethane linkages, such as the bifunctional siloxane monomers represented by formula (7):

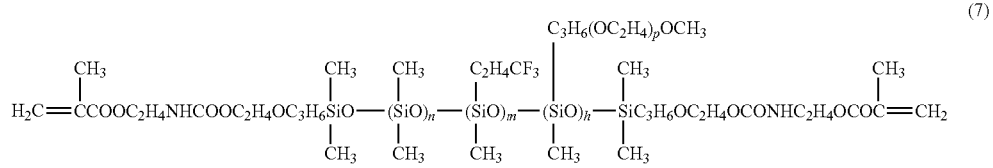

(7)

wherein n of formula (7) is an integer of about 100-150, m of formula (7) is an integer from about 5 to about 15, h is an integer from about 2 to 8, and p is an integer of about from about 5 to about 10. Additional examples of such bifunctional siloxane monomers, and methods of making compounds of formula (7) are described in U.S. Pat. No. 6,867,245, which is hereby incorporated by reference. In a particular example, the siloxane monomer can be a bifunctional siloxane monomer having two urethane linkages and having a molecular weight greater than about 5,000 daltons, such as, for example, a molecular weight greater than about 10,000 daltons, or a molecular weight of greater than about 15,000 daltons.

In one example, the second siloxane monomer component can comprise 3-[tris(trimethylsilyloxy)silyl]propyl methacrylate (TRIS) or MCS-M11 or both. In another example, the second siloxane monomer component can consist of TRIS or MCS-M11 or both. In another example, the second siloxane monomer component can comprise TRIS. In another example, the second siloxane monomer can consist of TRIS. In another example, the second siloxane monomer component can comprise MCS-M11. In yet another example, the second siloxane monomer can consist of MCS-M11.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component; and (d) a second siloxane monomer component; wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component; and (d) a second siloxane monomer component comprising TRIS, MCS-M11, or both; wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; (c) a first siloxane monomer component; and (d) a second siloxane monomer component comprising TRIS, MCS-M11, or both; wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component; and (d) TRIS; wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component; and (d) MCS-M11; wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (1); and (d) TRIS; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (1) having a number average molecular weight of from 400 to 700 daltons; and (d) TRIS; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) VMA, NVP or both, in an amount of from 30 to 60 unit parts by weight; (b) HEMA present in an amount of from 10 to 50 unit parts by weight; (c) a first siloxane monomer of formula (1) having a number average molecular weight of from 400 to 700 daltons; and (d) TRIS; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (2); and (d) TRIS; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (2) having a number average molecular weight of at least 7,000 daltons; and (d) TRIS; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; (c) a first siloxane monomer of formula (2) having a number average molecular weight of at least 7,000 daltons; and (d) TRIS; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (3); and (d) TRIS; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (3) having a number average molecular weight of about 1,500 daltons; and (d) TRIS; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; (c) a first siloxane monomer of formula (3) having a number average molecular weight of about 1,500 daltons; and (d) TRIS; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (1); and (d) MCS-M11; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (1) having a number average molecular weight of from 400 to 700 daltons; and (d) MCS-M11; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; (c) a first siloxane monomer of formula (1) having a number average molecular weight of from 400 to 700 daltons; and (d) MCS-M11; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (2); and (d) MCS-M11; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (2) having a number average molecular weight of at least 7,000 daltons; and (d) MCS-M11; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) VMA, NVP, or both, in an amount of from 30 to 60 unit parts by weight; (b) HEMA present in an amount of from 10 to 50 unit parts by weight; (c) a first siloxane monomer of formula (2) having a number average molecular weight of at least 7,000 daltons; and (d) MCS-M11; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (3); and (d) MCS-M11; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (3) having a number average molecular weight of about 1,500 daltons; and (d) MCS-M11; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; (c) a first siloxane monomer of formula (3) having a number average molecular weight of about 1,500 daltons; and (d) MCS-M11; wherein a total amount of siloxane monomer(s) present in the polymerizable composition is an amount of from 15 to 40 unit parts by weight.

The second siloxane monomer or second siloxane monomer component can be present in the polymerizable composition in an amount of from 1 to 39 unit parts by weight, or of 1 to 15 unit parts by weight, or of from 3 to 35 unit parts by weight, or of from 5 to 30 unit parts by weight, or of from 5 to 15 unit parts by weight, or of from 1 to 6 unit parts by weight, or of from 10 to 30 unit parts by weight.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (1) in an amount of from 3 to 30 unit parts by weight; and (d) a second siloxane monomer component in an amount of from 3 to 30 unit parts; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (1) in an amount of from 3 to 30 unit parts by weight; and (d) TRIS or MCS-M11 or both in an amount of from 3 to 30 unit parts; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (1) in an amount of from 1 to 39 unit parts by weight; and (d) TRIS in an amount of from 1 to 39 unit parts; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; (c) a first siloxane monomer of formula (1) in an amount of from 1 to 39 unit parts by weight; and (d) TRIS in an amount of from 1 to 39 unit parts; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (1) in an amount of from 1 to 39 unit parts by weight; and (d) MCS-M11 in an amount of from 1 to 39 unit parts; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; (c) a first siloxane monomer of formula (1) in an amount of from 1 to 39 unit parts by weight; and (d) MCS-M11 in an amount of from 1 to 39 unit parts; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (2) in an amount of from 3 to 30 unit parts by weight; and (d) a second siloxane monomer component in an amount of from 3 to 30 unit parts; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (2) in an amount of from 3 to 30 unit parts by weight; and (d) TRIS or MCS-M11 or both in an amount of from 3 to 30 unit parts; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (2) in an amount of from 1 to 6 unit parts by weight; and (d) TRIS in an amount of from 3 to 39 unit parts; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; (c) a first siloxane monomer of formula (2) in an amount of from 1 to 6 unit parts by weight; and (d) TRIS in an amount of from 3 to 39 unit parts; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (2) in an amount of from 1 to 6 unit parts by weight; and (d) MCS-M11 in an amount of from 3 to 39 unit parts; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) VMA, or VNP, or both, in an amount of from 30 to 60 unit parts by weight; (b) HEMA present in an amount of from 10 to 50 unit parts by weight; (c) a first siloxane monomer of formula (2) in an amount of from 1 to 6 unit parts by weight; and (d) MCS-M11 in an amount of from 3 to 39 unit parts; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (3) in an amount of from 3 to 30 unit parts by weight; and (d) a second siloxane monomer component in an amount of from 3 to 30 unit parts; wherein a total amount of siloxane monomer(s) present in the polymerizable composition is an amount of from 15 to 40 unit parts by weight.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (3) in an amount of from 3 to 30 unit parts by weight; and (d) TRIS or MCS-M11 or both in an amount of from 3 to 30 unit parts; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (3) in an amount of from 3 to 30 unit parts by weight; and (d) TRIS or MCS-M11 or both in an amount of from 3 to 30 unit parts; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (3) in an amount of from 1 to 39 unit parts by weight; and (d) TRIS in an amount of from 1 to 39 unit parts; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; (c) a first siloxane monomer of formula (3) in an amount of from 1 to 39 unit parts by weight; and (d) TRIS in an amount of from 1 to 39 unit parts; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer of formula (3) in an amount of from 1 to 39 unit parts by weight; and (d) MCS-M11 in an amount of from 3 to 39 unit parts; wherein a total amount of siloxane monomer(s) present in the polymerizable composition is an amount of from 15 to 40 unit parts by weight.

Another example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; (c)

a first siloxane monomer of formula (3) in an amount of from 1 to 39 unit parts by weight; and (d) MCS-M11 in an amount of from 3 to 39 unit parts; wherein a total amount of siloxane monomer(s) present in the polymerizable composition is an amount of from 15 to 40 unit parts by weight.

When the polymerizable composition comprises a first siloxane and a second siloxane, either as part of the first siloxane component, or as part of the optional second siloxane component, or as part of the at least one third siloxane monomer, or any combination thereof, the first siloxane monomer and the second siloxane monomer can be present in amounts such that the ratio of the first siloxane monomer to the second siloxane monomer is at least 1:1 based on unit parts, or is at least 2:1 based on unit parts. For example, the first siloxane monomer and the second siloxane monomer can be present in the polymerizable composition in a ratio from about 2:1 to about 10:1 based on unit parts. In another example, the first siloxane monomer and the second siloxane monomer can be present in the polymerizable composition in a ratio from about 3:1 to about 6:1 based on unit parts. In one example, the first siloxane monomer and the second siloxane monomer can be present in the polymerizable composition in a ratio of about 4:1 based on unit parts.

As used herein, "unit parts" is understood to mean unit parts by weight. For example, to prepare a formulation described as comprising x unit parts of a siloxane monomer and y unit parts of a hydrophilic monomer, the composition can be prepared by combining x grams of the siloxane monomer with y grams of the hydrophilic monomer to obtain a total of y+z grams of polymerizable composition, or by combining z ounces of the siloxane with y ounces of the hydrophilic monomer to obtain a total of y+z ounces of polymerizable composition, and so on. When the composition further comprises additional optional ingredients such as, for example, x unit parts of a cross-linking agent, x grams of the cross-linking agent are combined with z grams of the siloxane monomer and y grams of the hydrophilic monomer to obtain a total of x+y+z grams of polymerizable composition, and so on. When the composition comprises an additional optional ingredient comprising an ingredient component composed of two ingredients, such as, for example, a hydrophobic monomer component consisting of a first hydrophobic monomer and a second hydrophobic monomer, in addition to the z unit parts of siloxane monomer, the y unit parts of hydrophilic monomer and the x unit parts of the cross-linker, w unit parts of the first hydrophobic monomer and v unit parts of the second hydrophobic monomer are combined to obtain a total amount of v+w+x+y+z unit parts of the polymerizable composition. It is understood that the unit parts of the at least one hydrophobic monomer present in such a polymerizable is the sum of the unit parts of the first hydrophobic monomer and the unit parts of the second hydrophobic monomer, e.g., v+w unit parts in this example. Typically, a formula for a polymerizable composition will be composed of ingredients in amounts totaling from about 90 to about 110 unit parts by weight. When amounts of components of the polymerizable composition are recited herein as being in unit parts, it is to be understood that the unit parts of these component are based on a formula providing a total weight of the composition ranging from about 90 to 110 unit parts. In one example, the unit parts by weight can be based on a formula providing a total weight of the composition ranging from about 95 to 105 unit parts by weight, or from about 98 to 102 unit parts by weight.

Optionally, the polymerizable compositions of the present disclosure can further comprise at least one cross-linking agent. The optional at least one cross-linking agent can be present as a single cross-linking agent, or can be present as a cross-linking agent component comprising two or more single cross-linking agents. As used herein, the cross-linking agent and cross-linking agent component are understood to be non-silicon cross-linking agents and thus are different from multifunctional siloxane monomers which may be present in the polymerizable composition.

In accordance with the present disclosure, a cross-linking agent is understood to be a monomer having more than one polymerizable functional group as part of its molecular structure, such as two or three or four polymerizable functional groups, i.e., a multifunctional monomer such as a bifunctional or trifunctional or tetrafunctional monomer. Non-silicon cross-linking agents that can be used in the polymerizable compositions disclosed herein include, for example, without limitation, allyl(meth)acrylate, or lower alkylene glycol di(meth)acrylate, or poly(lower alkylene)glycol di(meth)acrylate, or lower alkylene di(meth)acrylate, or divinyl ether, or divinyl sulfone, or di- and trivinylbenzene, or trimethylolpropane tri(meth)acrylate, or pentaerythritol tetra(meth)acrylate, or bisphenol A di(meth)acrylate, or methylenebis(meth)acrylamide, or triallyl phthalate and diallyl phthalate, or any combination thereof. Cross-linking agents, as disclosed in Examples 1-25, include, for example, ethylene glycol dimethacrylate (EGDMA), or triethylene glycol dimethacrylate (TEGDMA), or triethylene glycol divinyl ether (TEGDVE), or allyl methacrylate (AMA), or any combination thereof. In one particular example, the optional at least one cross-linking agent can comprise or consist of EGDMA, AMA, or both. In another example, the cross-linking agent can have a molecular weight less than 1500 daltons, or less than 1000 daltons, or less than 500 daltons, or less than 200 daltons.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component; and (d) at least one cross-linking agent; wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; (c) a first siloxane monomer component; and (d) at least one cross-linking agent; wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; (c) a first siloxane monomer component; and (d) EGDMA, or AMA, or both; wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; (c) a first siloxane monomer component; and (d) EGDMA, or AMA, or both; wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; (c) a first siloxane monomer component; (d) a second siloxane monomer component, and (e) EGDMA, or AMA, or both; wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; (c) a first siloxane monomer component; (d) TRIS, or MCS-M11, or both, and (e) EGDMA, or AMA, or both; wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

Another example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; (c) a first siloxane monomer component; (d) TRIS; and (e) EGDMA, or AMA, or both; wherein a total amount of siloxane monomer(s) present in the polymerizable composition is an amount of from 15 to 40 unit parts by weight, and the first siloxane monomer component comprises at least one siloxane monomer selected from a siloxane monomer of formula (1), a siloxane monomer of formula (2), a siloxane monomer of formula (3), or any combination thereof.

In one example, the cross-linking agent or cross-linking agent component can comprise or consist of a vinyl-containing cross-linking agent. As used herein, a vinyl-containing cross-linking agent is a monomer having at least two polymerizable carbon-carbon double bonds (i.e., at least two vinyl polymerizable functional groups) present in its molecular structure, where each of the at least two polymerizable carbon-carbon double bonds present in the vinyl polymerizable functional groups of the vinyl-containing cross-linking agent is less reactive than a carbon-carbon double bond present in an acrylate or methacrylate polymerizable functional group. Although carbon-carbon double bonds are present in acrylate and methacrylate polymerizable functional groups, as understood herein, cross-linking agents comprising one or more acrylate or methacrylate polymerizable group (e.g., an acrylate-containing cross-linking agent or a methacrylate-containing cross-linking agent) are not considered to be vinyl-containing cross-linking agents. Polymerizable functional groups having carbon-carbon double bonds which are less reactive than the carbon-carbon double bonds of acrylate or methacrylate polymerizable groups include, for example, vinyl amide, vinyl ester, vinyl ether and allyl ester polymerizable functional groups. Thus, as used herein, vinyl-containing cross-linking agents include, for example, cross-linking agents having at least two polymerizable functional groups selected from a vinyl amide, a vinyl ether, a vinyl ester, an allyl ester, and any combination thereof. As used herein, a mixed vinyl-containing cross-linking agent is a cross-linking agent having at least one polymerizable carbon-carbon double bond (i.e., at least one vinyl polymerizable functional group) present in its structure which is less reactive than the carbon-carbon double bond present in an acrylate or methacrylate polymerizable functional group, and at least one polymerizable functional group present in its structure having a carbon-carbon double bond which is at least as reactive as the carbon-carbon double bond in an acrylate or methacrylate polymerizable functional group.

In one example, the cross-linking agent or cross-linking agent component can comprise or consist of a non-vinyl-containing cross-linking agent, i.e., a cross-linking agent which is not a vinyl-containing cross-linking agent. For example, the non-vinyl-containing cross-linking agent or cross-linking agent component can comprise or consist of an acrylate-containing cross-linking agent (i.e., a cross-linking agent having at least two acrylate polymerizable functional groups), or a methacrylate-containing cross-linking agent (i.e., at least two methacrylate polymerizable functional groups), or at least one acrylate-containing cross-linking agent and at least one methacrylate-containing cross-linking agent.

The cross-linking agent component can comprise or consist of a combination of two or more cross-linking agents, each of which has a different polymerizable functional group. For example, the cross-linking agent component can comprise one vinyl-containing cross-linking agent, and one acrylate-containing cross-linking agent. The cross-linking agent component can comprise one vinyl-containing cross-linking agent and one methacrylate-containing cross-linking group. The cross-linking agent component can comprise or consist of one vinyl ether-containing cross-linking agent, and one methacrylate-containing cross-linking agent.

When the polymerizable composition comprises at least one cross-linking agent, the first siloxane monomer component and the at least one cross-linking agent (i.e., a single cross-linking agent or a cross-linking agent component composed of two or more cross-linking agents) can be present in the polymerizable composition in a ratio of at least 10:1 based on the total unit parts by weight of the first siloxane monomer component to the total unit parts by weight of the at least one cross-linking agent (i.e., the sum of the unit parts of all vinyl-containing cross-linking agents present in the polymerizable composition). For example, the ratio can be at least 25:1 or at least 50:1 or at least 100:1 based on unit parts by weight.

In one example, the at least one cross-linking agent can comprise at least one vinyl-containing cross-linking agent, and at least one methacrylate-containing cross-linking agent. In another example, the at least one cross-linking agent can consist of only one or more vinyl-containing cross linking agents. In one particular example, the at least one cross-linking agent can comprise or consist of at least one vinyl ether-containing cross-linking agent.

When the at least one cross-linking agent comprises or consists of at least one vinyl-containing cross-linking agent (i.e., a single vinyl-containing cross-linking agent or a vinyl-containing cross-linking agent component composed of two or more vinyl-containing cross-linking agents), the first siloxane monomer component and the at least one vinyl-containing cross-linking agent can be present in the polymerizable composition in a ratio of at least about 50:1 based on a ratio of a total number of unit parts of the first siloxane monomer component to a total number of unit parts of the least one vinyl-containing cross-linking agent (i.e., the sum of the unit parts of all vinyl-containing cross-linking agents present in the polymerizable composition). For example, the ratio can be from about 50:1 to about 500:1, or from about 100:1 to about 400:1, or from about 200:1 to about 300:1 based on unit parts by weight.

When the polymerizable composition further comprises at least one additional siloxane monomer (i.e., an optional second siloxane monomer or monomer component, or an optional a third siloxane monomer) in combination with at least one cross-linking agent, the siloxane monomers and the at least one vinyl-containing monomer can be present in the polymerizable composition in a ratio of at least about 100:1 based on a ratio of a total number of unit parts of each siloxane monomer present in the polymerizable composition (i.e., the sum of the unit parts of the first siloxane and the second siloxane monomer and, if present, the third siloxane monomer, etc.) to a total number of unit parts of the least one vinyl-containing cross-linking agent (i.e., the sum of the unit parts of all vinyl-containing cross-linking agents present in the polymerizable composition). For example, the ratio can be from about 50:1 to about 500:1, or from about 100:1 to about 400:1, or from about 200:1 to about 300:1 based on unit parts by weight.

In one example, the polymerizable compositions of the present disclosure can optionally comprise an additional at least one hydrophilic monomer. The hydrophilic monomer is understood to be a non-silicone polymerizable ingredient having only one polymerizable functional group present in its molecular structure. The polymerizable compositions can comprise a single hydrophilic monomer, or can comprise two or more hydrophilic monomers present as the hydrophilic monomer component. Non-silicon hydrophilic monomers which can be used as the hydrophilic monomer or the hydrophilic monomer component in the polymerizable compositions disclosed herein include, for example, acrylamide-containing monomers, or acrylate-containing monomers, or acrylic acid-containing monomers, or methacrylate-containing monomers, or methacrylic acid-containing monomers, or any combination thereof. In one example, the hydrophilic monomer or monomer component can comprise or consist of a methacrylate-containing hydrophilic monomer. It is understood that the hydrophilic monomer or hydrophilic monomer component is a non-silicon monomer.

Examples of additional hydrophilic monomers which can be included in the present polymerizable compositions can include, for example, N,N-dimethylacrylamide (DMA), or 2-hydroxypropyl methacrylate, or 2-hydroxybutyl methacrylate (HOB), or 2-hydroxybutyl acrylate, or 4-hydroxybutyl acrylate glycerol methacrylate, or 2-hydroxyethyl methacrylamide, or polyethyleneglycol monomethacrylate, or methacrylic acid, or acrylic acid, or any combination thereof.

In one example, the additional hydrophilic monomer or hydrophilic monomer component can comprise or consist of a vinyl-containing monomer. Examples of hydrophilic vinyl-containing monomers which can be provided in the polymerizable compositions include, without limitation, N-vinyl caprolactam, or N-2-hydroxyethyl vinyl carbamate, or N-carboxy-β-alanine N-vinyl ester, or 1,4-butanediol vinyl ether (BVE), or ethylene glycol vinyl ether (EGVE), or diethylene glycol vinyl ether (DEGVE), or any combination thereof.

In another example, the additional hydrophilic vinyl-containing monomer or monomer component can comprise or consist of a vinyl ether-containing monomer. Examples of vinyl ether-containing monomers include, without limitation, 1,4-butanediol vinyl ether (BVE), or ethylene glycol vinyl ether (EGVE), or diethylene glycol vinyl ether (DEGVE), or any combination thereof. In one example, the hydrophilic monomer component comprises or consists of BVE. In another example, the hydrophilic monomer component comprises or consists of EGVE. In yet another example, the hydrophilic vinyl component comprises or consists of DEGVE.

As used herein, a vinyl-containing monomer is a monomer having a single polymerizable carbon-carbon double bond (i.e., a vinyl polymerizable functional group) present in its molecular structure, where, under free radical polymerization, the carbon-carbon double bond in the vinyl polymerizable functional group is less reactive than the carbon-carbon double bond present in an acrylate or a methacrylate polymerizable functional group. In other words, although a carbon-carbon double bond is present in acrylate groups and methacrylate groups, as understood herein, monomers comprising a single acrylate or methacrylate polymerizable group are not considered to be vinyl-containing monomers. Examples of polymerizable groups having carbon-carbon double bonds which are less reactive than the carbon-carbon double bonds of acrylate or methacrylate polymerizable groups include vinyl amide, vinyl ether, vinyl ester, and allyl ester polymerizable groups. Thus, as used herein, examples of vinyl-containing monomers include monomers having a single vinyl amide, a single vinyl ether, a single vinyl ester, or a single allyl ester polymerizable group.

While the polymerizable compositions of the present disclosure can optionally comprise an additional hydrophilic monomer (i.e., in addition to the at least one hydrophilic amide monomer having one N-vinyl group), in one example, the present polymerizable compositions can be free of N,N-dimethylacrylamide (DMA), for example, essentially free of DMA. Without being bound by theory, it is believed that the addition of DMA to the polymerizable compositions of the present invention may reduce the ability to include higher concentrations of siloxane monomers, particularly higher molecular weight siloxanes, while maintaining a miscible polymerizable composition capable of forming ophthalmically acceptably clear polymeric materials.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprises at least one siloxane monomer selected from a siloxane monomer of formula (1), a siloxane monomer of formula (2), a siloxane monomer of formula (3), or any combination thereof; and the polymerizable composition is free of DMA.

Another example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprises at least one siloxane monomer selected from a siloxane monomer of formula (1), a siloxane monomer of formula (2), a siloxane monomer of formula (3), or any combination thereof; and the polymerizable composition is free of DMA.

Another example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; (c) a first siloxane monomer component, and (d) a second siloxane monomer component; wherein a total amount of siloxane monomer(s) present in the polymerizable composition is an amount of from 15 to 40 unit parts by weight, the first siloxane monomer component comprises at least one siloxane monomer selected from a siloxane monomer of formula (1), a siloxane monomer of formula (2), a siloxane monomer of formula (3), or any combination thereof; and the polymerizable composition is free of DMA.

Another example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; (c) a first siloxane monomer component, and (d) TRIS, or MCS-M11, or both; wherein a total amount of siloxane monomer(s) present in the polymerizable composition is an amount of from 15 to 40 unit parts by weight, the first siloxane monomer component comprises at least one siloxane monomer selected from a siloxane monomer of formula (1), a siloxane monomer of formula (2), a siloxane monomer of formula (3), or any combination thereof; and the polymerizable composition is free of DMA.

Yet another example of a polymerizable composition in accordance with the present disclosure is a miscible polymerizable composition comprising (a) VMA, or NVP, or both, in an amount of from 30 to 60 unit parts by weight; (b) HEMA present in an amount of from 10 to 50 unit parts by weight; (c) a first siloxane monomer component, (d) TRIS, or MCS-M11, or both; and (e) at least one acrylate or methacrylate-containing cross-linking agent; wherein a total amount of siloxane monomer(s) present in the polymerizable composition is an amount of from 15 to 40 unit parts by weight, the first siloxane monomer component comprises at least one siloxane monomer selected from a siloxane monomer of formula (1), a siloxane monomer of formula (2), a siloxane monomer of formula (3), or any combination thereof; and the polymerizable composition is free of DMA.

In addition, the polymerizable compositions of the present disclosure can optionally comprise at least one non-silicon hydrophobic monomer. The hydrophobic monomer is understood to be a non-silicone polymerizable ingredient having only one polymerizable functional group present in its molecular structure. The at least one hydrophobic monomer of the polymerizable composition can be one hydrophobic monomer, or can comprise a hydrophobic monomer component composed of at least two hydrophobic monomers. Examples of hydrophobic monomers that can be used in the polymerizable compositions disclosed herein, include, without limitation, acrylate-containing hydrophobic monomers, or methacrylate-containing hydrophobic monomers, or any combination thereof. Examples of hydrophobic monomers include, without limitation, methyl acrylate, or ethyl acrylate, or propyl acrylate, or isopropyl acrylate, or cyclohexyl acrylate, or 2-ethylhexyl acrylate, or methyl methacrylate (MMA), or ethyl methacrylate, or propyl methacrylate, or butyl acrylate, or vinyl acetate, or vinyl propionate, or vinyl butyrate, or vinyl valerate, or styrene, or chloroprene, or vinyl chloride, or vinylidene chloride, or acrylonitrile, or 1-butene, or butadiene, or methacrylonitrile, or vinyltoluene, or vinyl ethyl ether, or perfluorohexylethylthiocarbonylaminoethyl methacrylate, or isobornyl methacrylate, or trifluoroethyl methacrylate, or hexafluoroisopropyl methacrylate, or hexafluorobutyl methacrylate, or ethylene glycol methyl ether methacrylate (EGMA), or any combination thereof. In one particular example, the hydrophobic monomer or monomer component can comprise or consist of MMA, or EGMA, or both.

When present in the polymerizable composition, the hydrophobic monomer or monomer component can be present in an amount from about 5 to about 25 unit parts, or from about 10 to about 20 unit parts.

In one example, the hydrophobic monomer component can comprise at least two hydrophobic monomers each having different polymerizable functional groups. In another example, the hydrophobic monomer component can comprise at least two hydrophobic monomers each having the same polymerizable functional group. The hydrophobic monomer component can comprise or consist of two hydrophobic monomers, both having the same polymerizable functional group. In one example, the hydrophobic monomer component can comprise or consist of two hydrophobic methacrylate-containing monomers. The hydrophobic monomer component can comprise or consist of MMA and EGMA. In one example, the at least two hydrophobic monomers of the hydrophobic monomer component can comprise or consist of MMA and EGMA, and the ratio of the unit parts of MMA to the unit parts of EGMA present in the polymerizable composition can be from about 6:1 to about 1:1. The ratio of the unit parts of MMA and EGMA present in the polymerizable composition can be about 2:1 based on the unit parts of MMA to the unit parts of EGMA.

The polymerizable composition can optionally include one or more polymerization initiators (i.e., ultraviolet (UV) initiators or thermal initiators, or both), or one or more UV absorbing agents, or one or more tinting agents, or one or more oxygen scavengers, or one or more chain transfer agents, or any combination thereof. These optional ingredients can be polymerizable or non-polymerizable ingredients. In addition, the present polymerizable compositions can be essentially free of water (e.g., contain no more than 3.0% or 2.0% water by weight).

The present polymerizable compositions can optionally comprise one or more polymerization initiators, i.e., the polymerizable composition can comprise an initiator, or can comprise an initiator component comprising two or more polymerization initiators. Polymerization initiators that can be included in the present polymerizable compositions include, for example, azo compounds, or organic peroxides, or both. Initiators that can be present in the polymerizable composition include, for example, without limitation, benzoin ethyl ether, or benzyl dimethyl ketal, or alpha, alpha-diethoxyacetophenone, or 2,4,6-trimethylbenzoyl diphenyl phosphine oxide, or benzoin peroxide, or t-butyl peroxide, or azobisisobutyronitorile, or azobisdimethylvaleronitorile, or any combination thereof. UV photoinitiators can include, for example, phosphine oxides such as diphenyl (2,4,6-trimethyl benzoyl)phosphine oxide, or benzoin methyl ether, or 1-hydroxycyclohexylphenyl ketone, or Darocur (available from BASF, Florham Park, N.J., USA), or Irgacur (also available from BASF), or any combination thereof. In many of Examples 1-25 disclosed herein, the polymerization initiator is the thermal initiator 2,2'-azobis-2-methyl propanenitrile (VAZO-64 from E.I. DuPont de Nemours & Co., Wilmington, Del., USA). Other commonly used thermoinitiators can include 2,2'-azobis(2,4-dimethylpentanenitrile) (VAZO-52) and 1,1'-azo bis(cyanocyclohexane) (VAZO-88). The polymerization initiator or initiator component can be present in the polymerizable composition in an amount from about 0.01 unit parts to about 2.0 unit parts, or in an amount from about 0.1 unit parts to about 1.0 unit parts, or from about 0.2 unit parts to about 0.6 unit parts by weight.

The polymerizable compositions of the present disclosure can comprise at least one thermal initiator, or at least one UV initiator, or both. The polymerizable compositions of the present disclosure can be thermally initiated, or UV initiated, or both, to form the polymeric lens body. The polymerizable compositions can be initiated in an atmosphere consisting essentially of air. Without being bound by theory, it is believed that the relatively high level of HEMA in the present polymerizable compositions make the present polymerizable compositions more amenable to curing in an air atmosphere and producing an ophthalmically acceptable silicone hydrogel contact lens body as compared to other polymerizable compositions which require curing in an essentially air or oxygen-free atmosphere in order to produce an ophthalmically acceptable lens body. However, it is possible for the polymerizable compositions can be initiated under an atmosphere essentially free of air or oxygen, e.g., under an atmosphere of an inert gas such as nitrogen gas.

Optionally, the present polymerizable compositions can comprise one or more UV absorbing agents, i.e., the polymerizable composition can comprise an UV absorbing agent, or can comprise an UV absorbing agent component comprising two or more UV absorbing agents. UV absorbing agents that can be included in the present polymerizable compositions include, for example, benzophenones, or benzotriazoles, or any combination thereof. In many of Examples 1-25 disclosed herein, the UV absorbing agent is 2-(4-Benzoyl-3-hydroxyphenoxy)ethyl acrylate (UV-416) or 2-(3-(2H-benzotriazol-2-YL)-4-hydroxy-phenyl)ethyl methacrylate (NORBLOC® 7966 from Noramco, Athens, Ga., USA). The UV absorbing agent or UV absorbing agent component can be present in the polymerizable composition in an amount from about 0.01 unit parts to about 5.0 unit parts, or in an amount from about 0.1 unit parts to about 3.0 unit parts, or from about 0.2 unit parts to about 2.0 unit parts by weight.

The polymerizable compositions of the present disclosure can also optionally include at least one tinting agent (i.e., one tinting agent or a tinting agent component comprising two or more tinting agents), although both tinted and clear lens products are contemplated. In one example, the tinting agent can be a reactive dye or pigment effective to provide color to the resulting lens product. The tinting agent or tinting agent component of the polymerizable composition can comprise a polymerizable tinting agent, or can comprise a non-polymerizable tinting agent, or any combination thereof. The polymerizable tinting agent can be a tinting agent whose molecular structure comprises a polymerizable functional group, or can be a tinting agent whose molecular structure includes both a monomer portion and a dye portion, i.e., the tinting agent can be a monomer-dye compound. The molecular structure of the tinting agent can comprise a beta sulfone functional group, or can comprise a triazine functional group. Tinting agents can include, for example, VAT Blue 6 (7,16-Dichloro-6,15-dihydroanthrazine-5,9,14,18-tetrone), or 1-Amino-4-[3-(beta-sulfatoethylsulfonyl)anilio]-2-anthraquinonesulfonic acid (C. I. Reactive Blue 19, RB-19), or a monomer-dye compound of Reactive Blue 19 and hydroxyethylmethacrylate (RB-19 HEMA), or 1,4-bis[4-[(2-methacryl-oxyethyl)phenylamino]anthraquinone (Reactive Blue 246, RB-246, available from Arran Chemical Company, Athlone, Ireland), or 1,4-Bis[(2-hydroxyethyl)amino]-9,10-anthracenedione bis(2-propenoic)ester (RB-247), or Reactive Blue 4, RB-4, or a monomer-dye compound of Reactive Blue 4 and hydroxyethyl methacrylate (RB-4 HEMA or "Blue HEMA"), or any combination thereof. In one example, the tinting agent or tinting agent component can comprise a polymerizable tinting agent. The polymerizable tinting agent component can comprise, for example, RB-246, or RB-274, or RB-4 HEMA, or RB-19 HEMA, or any combination thereof. Examples of monomer-dye compounds include RB-4 HEMA and RB-19 HEMA. Additional examples of monomer-dye compounds are described in U.S. Pat. Nos. 5,944,853 and 7,216,975, both of which are incorporated in their entirety by reference herein. Other exemplary tinting agents are disclosed, for example, in U.S. Patent Application Publication No. 2008/0048350, the disclosure of which is incorporated in its entirety herein by reference. In many of Examples 1-25 disclosed herein, the tinting agent is a reactive blue dye, such as those described in U.S. Pat. No. 4,997,897, the disclosure of which is incorporated in its entirety herein by reference. Other suitable tinting agents for use in accordance with the present invention are phthalocyanine pigments such as phthalocyanine blue, or phthalocyanine green, or chromic-alumina-cobaltous oxide, or chromium oxides, or various iron oxides for red, yellow, brown and black colors, or any combination thereof. Opaquing agents such as titanium dioxide can also be incorporated. For certain applications, a combination of tinting agents having different colors can be employed as the tinting agent component. If employed, the tinting agent or tinting agent component can be present in the polymerizable composition in an amount ranging from about 0.001 unit parts to about 15.0 unit parts, or about 0.005 unit parts to about 10.0 unit parts, or about 0.01 unit parts to about 8.0 unit parts.

The polymerizable compositions of the present disclosure can optionally comprise at least one oxygen scavenger, i.e., one oxygen scavenger or an oxygen scavenger component comprising two or more oxygen scavengers. Examples of oxygen scavengers which can be included as the oxygen scavenger or oxygen scavenger component of the present polymerizable compositions include, for example, Vitamin E, or phenolic compounds, or phosphite compounds, or phosphine compounds, or amine oxide compounds, or any combination thereof. For example, the oxygen scavenger or oxygen scavenger component can consist of or comprise a phosphine-containing compound. In many of Examples 1-25 disclosed herein, the oxygen scavenger or oxygen scavenger component is a phosphine-containing compound, such as triphenyl phosphine, or a polymerizable form of triphenyl phosphine, such as diphenyl(P-vinylphenyl)phosphine.

Chain transfer is a polymerization reaction in which the activity of a growing polymer chain is transferred to another molecule, reducing the average molecular weight of the final polymer. The polymerizable compositions of the present disclosure can optionally comprise at least one chain transfer agent, i.e., can comprise one chain transfer agent or can comprise a chain transfer agent component comprising at least two chain transfer agents. Examples of chain transfer agents which can be included as the chain transfer agent or the chain transfer component of the present polymerizable compositions include, for example, thiol compounds, or halocarbon compounds, or C3-C5 hydrocarbons, or any combination thereof. In many of Examples 1-25 disclosed herein, the chain transfer agent is allyloxy ethanol. When present in the polymerizable composition, the chain transfer agent or chain transfer agent component can be present in an amount from about 0.01 unit parts to about 1.5 unit parts, for example from about 0.1 unit parts to about 0.5 unit parts.

The contact lenses of the present disclosure, as they are configured to be placed or disposed on a cornea of an animal or human eye, are ophthalmically acceptable contact lenses. As used herein, an ophthalmically acceptable contact lens is understood to be a contact lens having at least one of a number of different properties as described below. An ophthalmically acceptable contact lens can be formed of, and packaged in, ophthalmically acceptable ingredients such that the lens is not cytotoxic and does not release irritating and/or toxic ingredients during wear. An ophthalmically acceptable contact lens can have a level of clarity in the optic zone of the lens (i.e., the portion of the lens providing vision correction) sufficient for its intended use in contact with the cornea of an eye, for example, a transmittance of at least 80%, or at least 90%, or at least 95% of visible light. An ophthalmically acceptable contact lens can have sufficient mechanical properties to facilitate lens handling and care for a duration of time based on its intended lifetime. For example, its modulus, tensile strength, and elongation can be sufficient to withstand insertion, wear, removal and, optionally, cleaning over the intended lifetime of the lens. The level of these properties which are appropriate will vary depending upon the intended lifetime and usage of the lens (e.g., single use daily disposable, multiple use monthly, etc). An ophthalmically acceptable contact lens can have an effective or appropriate ionoflux to substantially inhibit or substantially prevent corneal staining, such as corneal staining more severe than superficial or moderate corneal staining after continuous wear of the lens on a cornea for 8 or more hours. An ophthalmically acceptable contact lens can have a level of oxygen permeability sufficient to allow oxygen to reach the cornea of an eye wearing the lens in an amount sufficient for long term corneal health. An ophthalmically acceptable contact lens can be a lens which does not cause substantial or undue corneal swelling in an eye wearing the lens, for example, no more than about 5% or 10% corneal swelling after being worn on a cornea of an eye during an overnight sleep. An ophthalmically acceptable contact lens can be a lens which allows movement of the lens on the cornea of an eye wearing the lens sufficient to facilitate tear flow between the lens and the eye, in other words, does not cause the lens to adhere to the eye with sufficient force to prevent normal lens movement, and that has a low enough level of movement on the eye to allow vision correction. An ophthalmically acceptable contact lens can be a lens which allows wearing of the lens on the eye without undue or significant discomfort and/or irritation and/or pain. An ophthalmically acceptable contact lens can be a lens which inhibits or substantially prevents lipid and/or protein deposition sufficient to cause the lens wearer to remove the lens because of such deposits. An ophthalmically acceptable contact lens can have at least one of a water content, or a surface wettability, or a modulus or a design, or any combination thereof, that is effective to facilitate ophthalmically compatible wearing of the contact lens by a contact lens wearer at least for one day. Ophthalmically compatible wearing is understood to refer to the wearing of a lens by a lens wearer with little or no discomfort, and with little or no occurrence of corneal staining. Determining whether a contact lens is ophthalmically acceptable can be achieved using conventional clinical methods, such as those performed by an eye care practitioner, and as understood by persons of ordinary skill in the art.

As described herein, the polymeric lens bodies and silicone hydrogel contact lenses of the present disclosure are ophthalmically acceptably clear. In one example, an ophthalmically acceptably clear polymeric lens body and/or silicone hydrogel contact lens has a light transmittance of at least 90% for all wavelengths of light from 380 to 780 nanometers. In another example, an ophthalmically acceptably clear polymeric lens body and/or silicone hydrogel contact lens has a light transmittance of at least 95% for all wavelengths of light from 380 to 780 nanometers.

One example of a silicone hydrogel contact lens in accordance with the present disclosure is a silicone hydrogel contact lens, comprising: an ophthalmically acceptably clear polymeric lens body, the polymeric lens body being the reaction product of a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprises at least one siloxane monomer selected from a siloxane monomer of formula (1), a siloxane monomer of formula (2), a siloxane monomer of formula (3), or any combination thereof; and the silicone hydrogel contact lens has a light transmittance of at least 95% for wavelengths of light from 380 to 780 nanometers.

One example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body; contacting the polymeric lens body with a washing liquid to remove extractable material from the polymeric lens body; and packaging the polymeric lens body in a contact lens packaging solution in a contact lens package; wherein the silicone hydrogel contact lens has a light transmittance of at least 95% for wavelengths of light from 380 to 780 nanometers.

In one example of the present disclosure, the contact lens can have ophthalmically acceptably wettable lens surfaces. For example, the contact lens can have the ophthalmically acceptably wettable lens surfaces when the polymerizable composition used to form the polymeric lens body is free of an internal wetting agent, or when the polymerizable composition used to form the polymeric lens body is free of an organic diluent, or when the polymeric lens body is extracted in water or an aqueous solution free of a volatile organic solvent, or when the polymeric lens body is free of a surface plasma treatment, or any combination thereof.

One approach commonly used in the art to increase the wettability of contact lens surfaces is to apply treatments to the lens surfaces or to modify the lens surfaces. In accordance with the present disclosure, the silicone hydrogel contact lenses can have ophthalmically acceptably wettable lens surfaces without the presence of a surface treatment or surface modification. Surface treatments include, for example, plasma and corona treatments which increase the hydrophilicity of the lens surface. While it is possible to apply one or more surface plasma treatments to the present lens bodies, it is not necessary to do so in order to obtain a silicone hydrogel contact lens having ophthalmically acceptably wettable lens surfaces when fully hydrated. In other words, in one example, the silicone hydrogel contact lenses of the present disclosure can be free of a surface plasma or corona treatment.

One example of a silicone hydrogel contact lens in accordance with the present disclosure is a silicone hydrogel contact lens, comprising: an ophthalmically acceptably clear polymeric lens body, the polymeric lens body being the reaction product of a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; and wherein the surfaces of the silicone hydrogel contact lens are free of a surface plasma or corona treatment.

One example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body; contacting the polymeric lens body with a washing liquid to remove extractable material from the polymeric lens body; and packaging the polymeric lens body in a contact lens packaging solution in a contact lens package; wherein the method does not comprise a step of treating the polymeric lens body with a surface or corona treatment, and the resulting silicone hydrogel contact lens is free of a surface plasma or corona treatment.

Surface modifications include binding wetting agents to the lens surface, such as, for example, binding a wetting agent such as a hydrophilic polymer to at least a lens surface by chemical bonding or another form of chemical interaction. In some cases, the wetting agent may be bound to the lens surface as well as a least a portion of the polymeric matrix of the lens, i.e., at least a portion of the bulk of the lens, by chemical bonding or another form of chemical interaction. The ophthalmically acceptably wettable lens surfaces of the present disclosure can be ophthalmically acceptably wettable without the presence of a wetting agent (e.g., a polymeric material or a non-polymeric material) bound to at least the lens surface. While it is possible to bind one or more wetting agents to the present lenses, it is not necessary to do so in order to obtain a silicone hydrogel contact lens having ophthalmically acceptably wettable lens surfaces when fully hydrated. Thus, in one example, the lenses of the present disclosure can comprise wetting agents, such as, for example, hydrophilic polymers and including polyvinyl pyrrolidone, bound to a surface of the lens. Alternatively, in another example, the silicone hydrogel contact lenses of the present disclosure can be free of a wetting agent bound to the lens surface.

One example of a silicone hydrogel contact lens in accordance with the present disclosure is a silicone hydrogel contact lens, comprising: an ophthalmically acceptably clear polymeric lens body, the polymeric lens body being the reaction product of a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; wherein surfaces of the silicone hydrogel contact lens are free of a wetting agent bound thereto.

Alternatively, another example of a silicone hydrogel contact lens in accordance with the present disclosure is a silicone hydrogel contact lens, comprising: an ophthalmically acceptably clear polymeric lens body, the polymeric lens body being the reaction product of a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; wherein a surface of the silicone hydrogel contact lens includes a wetting agent bound thereto.

One example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body;

contacting the polymeric lens body with a washing liquid to remove extractable material from the polymeric lens body; and packaging the polymeric lens body in a contact lens packaging solution in a contact lens package; wherein the method does not comprise a step of binding a wetting agent to lens surfaces, and the lens surfaces are free of a wetting agent bound thereto.

Alternatively, another example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body; contacting the polymeric lens body with a washing liquid to remove extractable material from the polymeric lens body; and packaging the polymeric lens body in a contact lens packaging solution in a contact lens package; wherein the method further comprises a step of binding a wetting agent to a lens surface, and at least one lens surface includes a wetting agent bound thereto.

Another method of increasing lens wettability is to physically entrap a wetting agent within the lens body or contact lens, such as by introducing the wetting agent into the lens body when the lens body is swollen, and then returning the lens body to a less swollen state, thereby entrapping a portion of a wetting agent within the lens body. The wetting agent can be permanently trapped within the lens body, or can be released from the lens over time, such as during wear. The ophthalmically acceptably wettable lens surfaces of the present disclosure can be ophthalmically acceptably wettable without the presence of a wetting agent (e.g., a polymeric material or a non-polymeric material) physically entrapped in the lens body following formation of the polymeric lens body. While it is possible to physically entrap one or more wetting agents in the present lenses, it is not necessary to do so in order to obtain a silicone hydrogel contact lens having ophthalmically acceptably wettable lens surfaces when fully hydrated. Thus, in one example, the lenses of the present disclosure can comprise wetting agents, such as, for example, hydrophilic polymers and including polyvinyl pyrrolidone, entrapped within the lenses. Alternatively, the silicone hydrogel contact lenses of the present disclosure can be free of a wetting agent physically entrapped within the lens. As used herein, physically entrapped refers to immobilizing a wetting agent, or other ingredient, in the polymeric matrix of the lens with little or no chemical bonding or chemical interaction being present between the wetting agent and or other ingredient and the polymeric matrix. This is in contrast to ingredients that are chemically bound to the polymeric matrix, such as by ionic bonds, covalent bonds, van der Waals forces, and the like.

Another approach commonly used in the art to increase the wettability of silicone hydrogel contact lenses includes adding one or more wetting agents to the polymerizable composition. In one example, the wetting agent can be a polymeric wetting agent. However, the contact lenses of the present disclosure can have ophthalmically acceptably wettable lens surfaces when the polymerizable composition used to form the polymeric lens body is free of a wetting agent. While it is possible to include one or more wetting agents in the present polymerizable compositions to increase the wettability of the silicone hydrogel contact lenses of the present disclosure, it is not necessary to do so in order to obtain a silicone hydrogel contact lens having ophthalmically acceptably wettable lens surfaces. In other words, in one example, the silicone hydrogel contact lenses of the present disclosure can be formed from polymerizable compositions free of wetting agents. Alternatively, in another example, the polymerizable compositions of the present invention can further comprise a wetting agent.

In one example, the wetting agent can be an internal wetting agent. The internal wetting agent can be bound within at least a portion of the polymeric matrix of the lens. For example, the internal wetting agent can be bound within at least a portion of the polymeric matrix of the lens by chemical bonding or another form of chemical interaction. In some cases, the wetting agent may be bound to the lens surface as well. The internal wetting agent can comprise a polymeric material or a non-polymeric material. While it is possible to bind one or more internal wetting agents within the polymeric matrix of the present lenses, it is not necessary to do so in order to obtain a silicone hydrogel contact lens having ophthalmically acceptably wettable lens surfaces when fully hydrated. Thus, in one example, the lenses of the present disclosure can comprise internal wetting agents bound to at least a portion of the polymeric matrix of the lens. Alternatively, in another example, the silicone hydrogel contact lenses of the present disclosure can be free of an internal wetting agent bound to at least a portion of the polymeric matrix of the lens.

In another example, the wetting agent can be an internal polymeric wetting agent. The internal polymeric wetting agent can be present in the polymeric lens body as part of an interpenetrating polymer network (IPN) or a semi-IPN. An interpenetrating polymer network is formed by at least two polymers, each of which is cross-linked to itself, but none of which are cross-linked to each other. Similarly, a semi-IPN is formed by at least two polymers, at least one of which is cross-linked to itself but not to the other polymer, and the other of which is not cross-linked either to itself or the other polymer. In one example of the present disclosure, the contact lens can have ophthalmically acceptably wettable lens surfaces when the polymeric lens body is free of an internal polymeric wetting agent present in the lens body as an IPN or a semi-IPN. Alternatively, the contact lens can comprise an internal polymeric wetting agent present in the lens body as an IPN or a semi-IPN.

One example of a polymerizable composition in accordance with the present disclosure is a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprises at least one siloxane monomer selected from a siloxane monomer of formula (1), a siloxane monomer of formula (2), a siloxane monomer of formula (3), or any combination thereof; and wherein the polymerizable composition is free of a preformed polymeric wetting agent.

In yet another example, the wetting agent can be a linking compound present in the polymerizable composition used to form the lens body, or a linking agent physically entrapped within the polymeric lens body after the lens body has been formed. When the wetting agent is a linking compound, after polymerization of the lens body or entrapment of the linking agent in the polymeric lens body, the linking compound can subsequently link a second wetting agent to the lens body when the lens body is contacted by the wetting agent. The linking can occur as part of the manufacturing process, for example as a washing process, or can take place when the lens body is contacted by a packaging solution. The linking can take the form of an ionic bond, or a covalent bond, or a form of van der Waals attraction. The linking agent can comprise a boronic acid moiety or group such that a polymerized boronic acid moiety or group is present in the polymeric lens body, or such that a boronic acid moiety or group is physically entrapped in the polymeric lens body. For example, when the linking agent comprises a form of boronic acid, the second wetting agent can comprise a form of poly(vinyl alcohol) which becomes bound to the form of boronic acid. Optionally, silicone hydrogel contact lenses of the present disclosure can be understood to be free of linking agents. In one example, the silicone hydrogel contact lenses can be free of boronic acid moieties or groups, including polymerized boronic acid moieties or groups, that is, specifically, the silicone hydrogel contact lenses can be formed from a polymerizable composition free of a form of boronic acid such as, for example, a polymerizable form of boronic acid including vinyl phenyl boronic acid (VPB), can be formed of a polymer free of units derived from a polymerizable form of boronic acid such as vinyl phenyl boronic acid (VPB), and the polymeric lens body and the silicone hydrogel contact lenses can be free of a form of boronic acid, including polymeric or non-polymeric form of boronic acid, physically entrapped therein. Alternatively, the polymerizable composition, or the polymeric lens body, or the silicone hydrogel contact lens, or any combination thereof, can comprise at least one linking agent.

In addition to including wetting agents in the polymerizable composition and modifying the lens surfaces, washing polymeric lens bodies in volatile organic solvents or aqueous solutions of volatile organic solvent has been used to increase the wettability of lens surfaces. While it is possible to wash the present polymeric lens bodies in a volatile organic solvent or an aqueous solution of a volatile organic solvent, in accordance with the present disclosure, it is not necessary to do so in order to obtain a silicone hydrogel contact lens having ophthalmically acceptably wettable lens surfaces when fully hydrated. In other words, in one example, the silicone hydrogel contact lenses of the present invention have not been exposed to a volatile organic solvent, including a solution of a volatile organic solvent, as part of a manufacturing process. In one example, the silicone hydrogel contact lenses of the present invention can be formed from a polymerizable composition free of a wetting agent, or the polymeric lens body and/or hydrated contact lens can be free of a wetting agent, or free of surface treatment, or free of a surface modification, or was not exposed to a volatile organic solvent during the manufacturing process, or any combination thereof. Instead, for example, the silicone hydrogel contact lenses can be washed in washing liquids free of a volatile organic solvent, such as, for example, water or an aqueous solution free of a volatile organic solvent, including liquid free of a volatile lower alcohol.

The use of volatile organic solvents to extract lens bodies contributes significantly to production costs, due to factors such as the cost of the organic solvents, the cost of disposal of the solvents, the need to employ explosion-proof production equipment, the need to remove the solvents from the lenses prior to packaging, and the like. However, development of polymerizable compositions capable of consistently producing contact lenses with ophthalmically acceptably wettable lens surfaces when extracted in aqueous liquids free of volatile organic solvents can be challenging. For example, it is common to find non-wetting regions present on the lens surfaces of contact lenses which have been extracted in aqueous liquids free of volatile organic solvents.

One example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body; contacting the polymeric lens body with a washing liquid free of a volatile organic solvent to remove extractable material from the polymeric lens body; and packaging the polymeric lens body in a contact lens packaging solution in a contact lens package.

In one example, the contact lenses of the present disclosure are ophthalmically compatible silicone hydrogel contact lenses. Many different criteria can be evaluated to determine whether or not a contact lens is ophthalmically compatible, as will be discussed later. In one example, ophthalmically acceptable contact lenses have ophthalmically acceptably wettable surfaces when fully hydrated. A silicone hydrogel contact lens having ophthalmically acceptably wettable surfaces can be understood to refer to a silicone hydrogel contact lens that does not adversely affect the tear film of a lens wearer's eye to a degree that results in the lens wearer experiencing or reporting discomfort associated with placing or wearing the silicone hydrogel contact lens on an eye.

One method for evaluating the wettability of a lens surface is to measure its contact angle. Various methods of measuring contact angles are known to those of ordinary skill in the art, including the captive bubble method. The contact angle can be a static or dynamic contact angle. Silicone hydrogel contact lenses of the present invention can have captive bubble dynamic advancing contact angles of less than 120 degrees, such as, for example, less than 90 degrees when fully hydrated, less than 80 degrees when fully hydrated, less than 70 degrees when fully hydrated, or less than 65 degrees when fully hydrated, or less than 60 degrees when fully hydrated, or less than 50 degrees when fully hydrated. Silicone hydrogel contact lenses of the present invention can have captive bubble static contact angles of less than 70 degrees when fully hydrated, or less than 60 degrees when fully hydrated, or less than 55 degrees when fully hydrated, or less than 50 degrees when fully hydrated, or less than 45 degrees when fully hydrated.

One example of a silicone hydrogel contact lens in accordance with the present disclosure is a silicone hydrogel contact lens, comprising: an ophthalmically acceptably clear polymeric lens body, the polymeric lens body being the reaction product of a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprises at least one siloxane monomer selected from a siloxane monomer of formula (1), a siloxane monomer of formula (2), a siloxane monomer of formula (3), or any combination thereof; and the silicone hydrogel contact lens has a captive bubble dynamic advancing contact angle of less than 120 degrees when fully hydrated.

One example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body; contacting the polymeric lens body with a washing liquid to remove extractable material from the polymeric lens body; and packaging the polymeric lens body in a contact lens packaging solution in a contact lens package; wherein the silicone hydrogel contact lens body has a captive bubble dynamic advancing contact angles of less than 120 degrees when fully hydrated.

In accordance with the present disclosure, the silicone hydrogel contact lenses have, when fully hydrated, equilibrium water contents (EWC)s from about 30 to about 70%. For example, the contact lenses can have an EWC from about 45% to about 65%, or from about 50% to about 63%, or from about 50% to about 67%, or from about 55% to about 65% by weight when fully hydrated. Methods of determining EWC are known to those of ordinary skill in the art, and can be based on weight loss from a lens during a drying process.

One example of a silicone hydrogel contact lens in accordance with the present disclosure is a silicone hydrogel contact lens, comprising: an ophthalmically acceptably clear polymeric lens body, the polymeric lens body being the reaction product of a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprises at least one siloxane monomer selected from a siloxane monomer of formula (1), a siloxane monomer of formula (2), a siloxane monomer of formula (3), or any combination thereof; and the silicone hydrogel contact lens has an EWC of from 30 to 70% when fully hydrated.

One example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body; contacting the polymeric lens body with a washing liquid to remove extractable material from the polymeric lens body; and packaging the polymeric lens body in a contact lens packaging solution in a contact lens package; wherein the silicone hydrogel contact lens has an EWC of from 30 to 70% when fully hydrated.

The present contact lenses can have an oxygen permeability (or Dk) of at least 55 barrers (Dk≥55 barrers), or an oxygen permeability of at least 60 barrers (Dk≥60 barrers), or an oxygen permeability of at least 65 barrers (Dk≥65 barrers). The lenses can have an oxygen permeability from about 55 barrers to about 135 barrers, or from about 60 barrers to about 120 barrers, or from about 65 barrers to about 90 barrers, or from about 50 barrers to about 75 barrers. Various methods of determining oxygen permeability are known to those of ordinary skill in the art.

Another example of the present silicone hydrogel contact lenses can have an oxygen permeability of from 20 to 130 barrers, or of from 20 to 75 barrers, or of from 50 to 70 barrers, or of 30 to 50 barrers.

One example of a silicone hydrogel contact lens in accordance with the present disclosure is a silicone hydrogel contact lens, comprising: an ophthalmically acceptably clear polymeric lens body, the polymeric lens body being the reaction product of a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprises at least one siloxane monomer selected from a siloxane monomer of formula (1), a siloxane monomer of formula (2), a siloxane monomer of formula (3), or any combination thereof; and the silicone hydrogel contact lens has an oxygen permeability of from 50 to 70 barrers.

Another example of a silicone hydrogel contact lens in accordance with the present disclosure is a silicone hydrogel contact lens, comprising: an ophthalmically acceptably clear polymeric lens body, the polymeric lens body being the reaction product of a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprises at least one siloxane monomer selected from a siloxane monomer of formula (1), a siloxane monomer of formula (2), a siloxane monomer of formula (3), or any combination thereof; and the silicone hydrogel contact lens has an oxygen permeability of from 30 to 50 barrers.

One example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body; contacting the polymeric lens body with a washing liquid to remove extractable material from the polymeric lens body; and packaging the polymeric lens body in a contact lens packaging solution in a contact lens package; wherein the silicone hydrogel contact lens has an oxygen permeability of from 50 to 70 barrers.

Another example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body; contacting the polymeric lens body with a washing liquid to remove extractable material from the polymeric lens body; and packaging the polymeric lens body in a contact lens packaging solution in a contact lens package; wherein the silicone hydrogel contact lens has an oxygen permeability of from 30 to 50 barrers.

The silicone hydrogel contact lenses of the present disclosure can have, when fully hydrated, an average tensile modulus about 0.20 MPa to about 0.90 MPa. For example, the average modulus can be from about 0.30 MPa to about 0.80 MPa, or from about 0.40 MPa to about 0.75 MPa, or from about 0.50 MPa to about 0.70 MPa.

As used herein, the modulus of a contact lens or lens body is understood to refer to the tensile modulus, also known as Young's modulus. It is a measure of the stiffness of an elastic material. The tensile modulus can be measured using a method in accordance with ANSI Z80.20 standard. In one example, the tensile modulus can be measured using an Instron Model 3342 or Model 3343 mechanical testing system.

The present contact lenses can have, when fully hydrated, an oxygen permeability of at least 55 barrers (Dk≥55 barrers), or a tensile modulus from about 0.2 MPa to about 0.9 MPa, or a captive bubble dynamic advancing contact angle less than 90 degrees, or a captive bubble static contact angle less than 70 degrees, or any combination thereof. In one example, the contact lenses can have, when fully hydrated, an oxygen permeability of at least 60 barrers (Dk≥60 barrers), or a tensile modulus from about 0.3 MPa to about 0.8 MPa, or a captive bubble dynamic advancing contact angle less than 70 degrees, or a captive bubble static contact angle less than 55 degrees, or any combination thereof. The present contact lenses can have, when fully hydrated, an oxygen permeability of at least 65 barrers, or a tensile modulus from about 0.4 MPa to about 0.75 MPa, a captive bubble dynamic advancing contact angle less than 70 degrees, or a captive bubble static contact angle less than 55 degrees, or any combination thereof.

In one example, the present contact lenses can have, when fully hydrated, an oxygen permeability of at least 55 barrers (Dk≥55 barrers), and a tensile modulus from about 0.2 MPa to about 0.9 MPa, and a captive bubble dynamic advancing contact angle less than 70 degrees, and a captive bubble static contact angle less than 55 degrees.

The silicone hydrogel contact lenses of the present disclosure can have, when fully hydrated, an average percentage of energy loss from about 25% to about 40%. For example, the average percentage of energy loss can be from about 27% to about 40%, or can be from about 30% to about 37%.

As used herein, percentage of energy loss is a measure of the energy lost as heat when energy loading and unloading cycles are applied to viscoelastic materials. Percentage of energy loss can be determined using a number of methods known to those of ordinary skill in the art. For example, the force involved in stretching a sample to 100% strain, and then returning it to 0% at a constant rate can be determined and used to calculate the percentage energy loss for the material.

The present contact lenses, when fully hydrated, can have an ionoflux less than about $8.0 \times 10^{-3}$ mm$^2$/min, or less than about $7.0 \times 10^{-3}$ mm$^2$/min, or less than about $5.0 \times 10^{-3}$ mm$^2$/min. Various methods of determining ionoflux are conventional and are known to those of ordinary skill in the art.

In one example, the hydrated silicone hydrogel contact lenses of the present disclosure can have a diameter (chord diameter) that is at least 20% larger than the diameter of the lens body prior to washing. Thus, prior to washing the lens body, the pre-washed lens body has a first diameter of Y, and after washing, the hydrated lens body has a second diameter that is at least 1.20×Y. In one example, the silicone hydrogel contact lenses have a diameter (chord diameter) that is at least 24% larger than the diameter of the lens body prior to washing. Thus, prior to washing the lens body, the pre-washed lens body has a first diameter of Y, and after washing, the hydrated lens body has a second diameter that is at least 1.24×Y. In another example, silicone hydrogel contact lenses have a diameter (chord diameter) that is at least 26% larger than the diameter of the lens body prior to washing. Thus, prior to washing the lens body, the pre-washed lens body has a first diameter of Y, and after washing, the hydrated lens body has a second diameter that is at least 1.26 x Y. The percentage increase in the diameter of the lens body in a dry state to a fully hydrated state is referred to as the lens' swell factor herein. The swell factor of the present silicone hydrogel contact lenses can be at least 20%, or at least 24%, or at least 26%, or from 20 to 40%, or from 24% to 40%, or from 26% to 40%.

One example of a silicone hydrogel contact lens in accordance with the present disclosure is a silicone hydrogel contact lens, comprising: an ophthalmically acceptably clear polymeric lens body, the polymeric lens body being the reaction product of a miscible polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprises at least one siloxane monomer selected from a siloxane monomer of formula (1), a siloxane monomer of formula (2), a siloxane monomer of formula (3), or any combination thereof; and the silicone hydrogel contact lens has a swell factor of from 24 to 40% when fully hydrated.

One example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body; contacting the polymeric lens body with a washing liquid to remove extractable material from the polymeric lens body; and packaging the polymeric lens body in a contact lens packaging solution in a contact lens package; wherein the silicone hydrogel contact lens has a swell factor of from 24 to 40% when fully hydrated.

In one example, the present contact lenses can have a wet extractable component. The wet extractable component is determined based on the weight lost during methanol extraction of contact lenses which have been fully hydrated and sterilized prior to drying and extraction testing. The wet extractable component can comprise unreacted and/or partially reacted polymerizable ingredients of the polymerizable composition. The wet extractable component consists of organic solvent-extractable materials remaining in the lens body after the lens body has been fully processed to form a sterilized contact lens, for lenses formed from polymerizable compositions comprising non-polymerizable ingredients. For lenses extracted during manufacturing in either an extraction liquid comprising a volatile organic solvent or an extraction liquid free of an organic solvent, in most cases, substantially all of the non-polymerizable ingredients will have been removed from the lens body, and so the wet extractable component may consist essentially of extractable components formed from reactive polymerizable ingredients of the polymerizable composition, i.e., unreacted polymerizable components and partially reacted polymerizable ingredients. In lenses made from a polymerizable composition free of a diluent, the wet extractable component can be present in the contact lens in an amount from about 1% wt/wt to about 15% wt/wt, or from about 2% wt/wt to about 10% wt/wt, or from about 3% wt/wt to about 8% wt/wt based on the dry weight of the lens body prior to extraction testing. In lenses made from a polymerizable composition comprising a diluent, the wet extractable component may consist of a portion of the diluent as well as unreacted and partially reacted polymerizable ingredients, and can be present in the contact lens in an amount from about 1% wt/wt to about 20% wt/wt, or from about 2% wt/wt to about 15% wt/wt of the lens, or from about 3% wt/wt to about 10% wt/wt based on the dry weight of the lens body prior to extraction testing.

In one example, the present contact lenses have a dry extractable component. The dry extractable component is determined based on the weight lost during extraction in methanol of polymeric lens bodies which have not been washed, extracted (as part of a manufacturing process), hydrated or sterilized prior to the drying and extraction testing. The dry extractable component can comprise unreacted or partially reacted polymerizable ingredients of the polymerizable composition. When optional non-polymerizable ingredients such as diluents and the like are present in the polymerizable composition, the dry extractable component may further comprise the non-polymerizable ingredients.

In lenses made from a polymerizable composition free of a diluent, the dry extractable component of the lens consists primarily of dry extractable components contributed by polymerizable ingredients of the polymerizable composition (i.e., unreacted or partially reacted polymerizable ingredients), and may also include dry extractable materials contributed by optional non-polymerizable components present in the polymerizable composition in small amounts (e.g., less than 3% wt/wt), such as, for example, tinting agents, oxygen scavengers, and the like. In lenses made from a polymerizable composition free of a diluent, the dry extractable component can be present in the polymeric lens body in an amount from about 1% wt/wt to about 30% wt/wt of the lens body, or from about 2% wt/wt to about 25% wt/wt, or from about 3% wt/wt to about 20% wt/wt, or from about 4% wt/wt to about 15% wt/wt, or from 2% wt/wt to less than 10% wt/wt based on the dry weight of the lens body prior to extraction testing.

In lenses made from a polymerizable composition comprising a large amount (e.g., more than 3% wt/wt) of an optional non-polymerizable ingredient such as a diluent, the dry extractable component consists of extractable materials contributed by reactive ingredients as well as extractable components contributed by non-polymerizable ingredients of the polymerizable composition. The total amount of dry extractable components contributed by reactive ingredients and non-polymerizable ingredients present in the contact lens can consist of an amount from about 1% wt/wt to about 75% wt/wt, or from about 2% wt/wt to about 50% wt/wt of the lens, or from about 3% wt/wt to about 40% wt/wt, or from about 4% wt/wt to about 20% wt/wt, or from about 5% to about 10% based on the dry weight of the polymeric lens body prior to extraction testing. The total amount of dry extractable components contributed by polymerizable ingredients (i.e., unreacted or partially reacted polymerizable ingredients) can be an amount from about 1% wt/wt to about 30% wt/wt of the lens body, or from about 2% wt/wt to about 25% wt/wt, or from about 3% wt/wt to about 20% wt/wt, or from about 4% wt/wt to about 15% wt/wt, or from 2% wt/wt to less than 10% wt/wt based on the dry weight of the lens body prior to extraction testing.

As used herein, a batch of silicone hydrogel contact lenses refers to a group of two or more silicone hydrogel contact lenses, and frequently, a batch refers to at least 10, or at least 100, or at least 1,000 silicone hydrogel contact lenses. In accordance with the present disclosure, a batch of silicone hydrogel contact lenses comprises a plurality of any of the silicone hydrogel contact lenses described herein.

One example of a batch of silicone hydrogel contact lenses can comprise a plurality of the silicone hydrogel contact lenses formed from any one of the polymerizable compositions described herein, wherein the batch of silicone hydrogel contact lenses, when fully hydrated, has at least two average values selected from an average equilibrium water content (EWC) from about 30% to about 70%, an average tensile modulus from about 0.2 MPa to about 0.9 MPa, and an average energy loss from about 25% to about 35%, an average swell factor from about 24% to about 40%; based on averages of values determined for at least 20 individual lenses of the batch.

In another example, the batch of silicone hydrogel contact lenses can comprise a plurality of silicone hydrogel contact lenses formed from one of the polymerizable compositions described herein, wherein the batch of silicone hydrogel contact lenses has at least two average values selected from an average oxygen permeability of from 20 to 130 barrers, an average tensile modulus from about 0.2 MPa to about 0.9 MPa when fully hydrated, an average captive bubble dynamic advancing contact angle less than 70 degrees when fully hydrated, and an average captive bubble static contact angle less than 55 degrees when fully hydrated; based on averages of values determined for at least 20 individual lenses of the batch.

In one example, when initially tested shortly after manufacturing and then tested again at a later time point, a batch of lenses of the present disclosure can exhibit a change in its average physical dimensions. As batches of lenses in accordance with the present disclosure are dimensionally stable, they can exhibit an acceptable level of change in their average physical dimensions. As used herein, dimensional stability variance is understood to refer to a variance in a value of a physical dimension between a value of the physical dimension determined when the batch of lenses is initially tested shortly after its manufacture, and the value of the physical dimension determined when the batch of lenses is tested again at a later time point. The later time point can be, for example, from at least 2 weeks after the initial time point, to up to 7 years after the initial time point. The silicone hydrogel contact lenses of the batch have an average dimensional stability variance of less than plus or minus three percent (±3.0%) based on averaging the lens diameter measurements of a representative number of lenses from the batch, such as, for example, 20 lenses from the batch. For a batch of lenses, an average dimensional stability variance of less than plus or minus three percent (±3.0%), where the average dimensional stability variance is the variance in a value of a physical dimension when measured at an initial time point within one day of a manufacturing date of the batch of lenses, and at a second time point, where the second time point is from two weeks to seven years after the initial time point when the batch is stored at room temperature, or, when the batch is stored at a higher temperature (i.e., under accelerated shelf life testing conditions), the second time point is a time point representative of storage of the batch from two weeks to seven years at room temperature, is considered to be a dimensionally stable batch. In one example, accelerated shelf life testing conditions which are especially useful in determining average dimensional stability variance are for 4 weeks at 70 degrees C., although other periods of time and other temperatures can be used. The average dimensional stability variance is determined by averaging the individual dimensional stability variances for each of the representative lenses using the actual diameters of representative lenses measured initially (Diameter$_{Original}$) and the actual diameters of representative lenses measured following (Diameter$_{Final}$) storage at room temperature or under accelerated shelf life conditions. The representative lenses measured initially and the representative lenses measured following storage can be the same lenses or can be different lenses. As used herein, the average dimensional stability variance is represented as a percent (%). The individual dimensional stability variances are determined using the following equation (A):

$$((Diameter_{Final} - Diameter_{Original})/Diameter_{Original}) \times 100 \quad (A).$$

On average, the diameters of the silicone hydrogel contact lenses of the batch vary by less than three percent in either direction of a target value (±3.0%). As one example, if a contact lens has a target diameter (chord diameter) of 14.20 mm, the present batch of silicone hydrogel contact lenses will have an average diameter (average of the population in the batch) from 13.77 mm to 14.63 mm. In one example, the dimensional stability variance is less than plus or minus two percent (±2.0%). As one example, if a contact lens has a target diameter (chord diameter) of 14.20 mm, the present batch of silicone hydrogel contact lenses will have an average diameter (average of the population in the batch) from 13.92 mm to 14.48 mm. Preferably, the average diameter of the batch of silicone hydrogel contact lenses does not vary by more than plus or minus 0.20 mm from the target diameter, which is commonly from 13.00 mm to 15.00 mm.

In accelerated shelf life studies, the average dimensional stability variance can be determined for contact lenses that were stored for a period of time at an elevated temperature, such as above 40 degrees C., including, for example, 50 degrees C., or 55 degrees C., or 65 degrees C., or 70 degrees C., or 80 degrees C., or 95 degrees C., and the like. Or, the average dimensional stability can be determined for contact lenses that were stored for a period of time at room temperature (e.g., about 20-25 degrees C.).

For accelerated shelf life studies, the following formula can be used to determine the number of months of storage at a particular temperature that are equivalent to storage for a desired length of time at room temperature:

$$\text{Desired shelf life} = [N \times 2^y] + n \quad (B)$$

where
N=number of months of storage under accelerated conditions
$2^y$=acceleration factor
y=(test temperature−25° C.)/10° C.
n=age of lenses (in months) at start of the study
Based on this equation, the following storage times have been calculated: 6 months of storage at 35 degrees C. is equivalent to 1 year aging at 25 degrees C., 3 months of storage at 45 degrees C. is equivalent to 1 year of aging at 25 degrees C., 3 months of storage at 55 degrees C. is equivalent to 2 years of aging at 25 degrees C., and 3 months of storage at 65 degrees C. is equivalent to 4 years of aging at 25 degrees C.

The present disclosure also provides methods of manufacturing silicone hydrogel contact lenses. The method is a method of manufacturing a silicone hydrogel contact lens, comprising: providing a polymerizable composition. The polymerizable composition of the method comprises (a) at least one hydrophilic amide monomer having one N-vinyl group present in an amount of from 30 to 60 unit parts by weight. The polymerizable composition also comprises (b) HEMA present in an amount of from 10 to 50 unit parts by weight. The polymerizable composition also comprises (c) a first siloxane monomer component, wherein a total amount of siloxane monomer(s) present in the polymerizable composition is an amount of from 15 to 40 unit parts by weight. The first siloxane monomer component of the polymerizable composition comprises at least one siloxane monomer selected from a siloxane monomer of formula (1), a siloxane monomer of formula (2), a siloxane monomer of formula (3), or any combination thereof. The siloxane monomer of formula (1) is a siloxane monomer represented by formula (1):

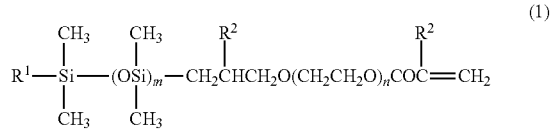

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group. The siloxane of formula (2) is a siloxane monomer represented by formula (2):

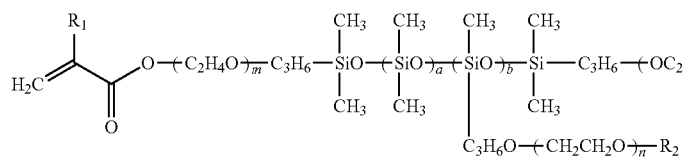

wherein $R^1$ of formula (2) is selected from either hydrogen or a methyl group; $R^2$ of formula (2) is selected from either of hydrogen or a C1-4 hydrocarbon group; m of formula (2) represents an integer of from 0 to 10; n of formula (2) represents an integer of from 4 to 100; a and b of formula (2) represent integers of 1 or more; a+b of formula (2) is equal to 20-500; b/(a+b) is equal to 0.01-0.22, and the configuration of siloxane units includes a random configuration. The siloxane monomer of formula (3) is a siloxane monomer represented by formula (3):

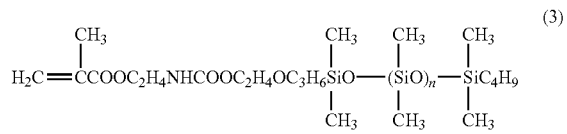

wherein n of formula (3) is an integer from 0-30. The present method also comprises the step of polymerizing the polymerizable composition in a contact lens mold assembly to form a polymeric lens body. The present method also comprises the step of contacting the polymeric lens body with a washing liquid to remove extractable material from the polymeric lens body. The present method also comprises the step of packaging the polymeric lens body in a contact lens packaging solution in a contact lens package.

As disclosed herein, the present method comprises a step of polymerizing the polymerizable composition to form a polymeric lens body. The step of polymerizing the polymerizable composition can be conducted in a contact lens mold assembly. The polymerizable composition can be cast molded between molds formed of a thermoplastic polymer. The thermoplastic polymer used to form the molding surfaces of the mold can comprise a polar polymer, or can comprise a nonpolar polymer. Alternatively, the polymerizable composition can be formed into a lens via various methods known to those of ordinary skill in the art, such as spin casting, injection molding, forming a polymerized rod that is subsequently lathed to form a lens body, etc.

One example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition in a contact lens mold assembly having a molding surface formed of a non-polar thermoplastic polymer to form a polymeric lens body; contacting the polymeric lens body with a washing liquid to remove extractable material from the polymeric lens body; and packaging the polymeric lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition in a contact lens mold assembly having a molding surface formed of a polar thermoplastic polymer to form a polymeric lens body; contacting the polymeric lens body with a washing liquid to remove extractable material from the polymeric lens body; and packaging the polymeric lens body in a contact lens packaging solution in a contact lens package.

As disclosed herein, the present method comprises polymerizing the polymerizable composition in a mold assembly to form a polymeric lens body. The polymerizing can be thermally initiated, or can be UV initiated, or both. The polymerizing can be conducted under an atmosphere consisting essentially of air, or can be conducted under an atmosphere essentially free of air or oxygen, e.g., under an inert gas atmosphere.

One example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; thermally polymerizing the polymerizable composition in a contact lens mold assembly to form a polymeric lens body; contacting the polymeric lens body with a washing liquid to remove extractable material from the polymeric lens body; and packaging the polymeric lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; thermally polymerizing the polymerizable composition in a contact lens mold assembly having a molding surface formed of a non-polar thermoplastic polymer to form a polymeric lens body; contacting the polymeric lens body with a washing liquid to remove extractable material from the polymeric lens body; and packaging the polymeric lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition under an atmosphere consisting essentially of air in a contact lens mold assembly to form a polymeric lens body; contacting the polymeric lens body with a washing liquid to remove extractable material from the polymeric lens body; and packaging the polymeric lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; thermally polymerizing the polymerizable composition under an atmosphere consisting essentially of air in a contact lens mold assembly to form a polymeric lens body; contacting the polymeric lens body with a washing liquid to remove extractable material from the polymeric lens body; and packaging the polymeric lens body in a contact lens packaging solution in a contact lens package.

Yet another example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; thermally polymerizing the polymerizable composition under an atmosphere consisting essentially of air in a contact lens mold assembly having a molding surface formed of a non-polar thermoplastic polymer to form a polymeric lens body; contacting the polymeric lens body with a washing liquid to remove extractable material from the polymeric lens body; and packaging the polymeric lens body in a contact lens packaging solution in a contact lens package.

The method can also comprise the step of demolding the contact lens mold assembly to produce a first mold section and a second mold section separated from the first mold section, wherein the polymerized lens body remains attached to the first or second mold section. The demolding step can comprise a wet demolding step in which the lens body and the mold assembly are contacted by a liquid in order to assist in the demolding, such as, for example, dipping the mold assembly in a liquid. The liquid can comprise water or an aqueous solution free of a volatile organic solvent, or can comprise a volatile organic solvent or a solution of a volatile organic solvent. The wet demolding step can also include a mechanical process of separating the wet mold sections of the mold assembly Alternatively, the demolding step can comprise a dry demolding step in which the mold sections of the mold assembly are separated by a mechanical method which does not involve contacting the lens body and the mold assembly with a liquid.

One example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprises at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body; wet demolding the contact lens assembly using a liquid comprising water or an aqueous solution free of a volatile organic solvent; contacting the polymeric lens body with a washing liquid to remove extractable material from the polymeric lens body; and packaging the polymeric lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body; dry demolding the contact lens assembly; contacting the polymeric lens body with a washing liquid to remove extractable material from the polymeric lens body; and packaging the polymeric lens body in a contact lens packaging solution in a contact lens package.

The method can also comprise a delensing step which separates the polymerized lens body from the mold section to which it is attached to produce a delensed lens body. The delensing step can be a wet delensing step in which the mold section and the lens body are contacted by a liquid in order to assist in the delensing such as, for example, a "float off" method in which the lens body and the mold section are submerged in a liquid until the lens body is released from the mold section. The liquid can comprise water or an aqueous solution free of a volatile organic solvent, or can comprise a volatile organic solvent or a solution of a volatile organic solvent. Alternatively, the delensing step can comprise a dry delensing step in which the lens body and the mold section are separated by a mechanical method which does not involve contacting the lens body and the mold assembly with a liquid.

One example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprises at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body; wet delensing the contact lens body using a liquid comprising water or an aqueous solution free of a volatile organic solvent; contacting the polymeric lens body with a washing liquid to remove extractable material from the polymeric lens body; and packaging the polymeric lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body; dry delensing the contact lens body; contacting the polymeric lens body with a washing liquid to remove extractable material from the polymeric lens body; and packaging the polymeric lens body in a contact lens packaging solution in a contact lens package.

Yet another example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body; dry demolding the contact lens mold assembly; dry delensing the contact lens body; contacting the polymeric lens body with a washing liquid to remove extractable material from the polymeric lens body; and packaging the polymeric lens body in a contact lens packaging solution in a contact lens package.

The method can also comprise contacting the polymeric lens body with a washing liquid to remove extractable material, such as unreacted monomers, uncross-linked materials that are otherwise not physically immobilized in the polymeric lens body, diluents, and the like. The washing liquid can be a liquid free of a volatile organic solvent, or can comprise a volatile organic solvent (e.g., can be a volatile organic solvent or a solution of a volatile organic solvent). In one example, the silicone hydrogel contact lens is not contacted by a volatile organic solvent during its manufacturing process. In a particular example, when the silicone hydrogel contact lens is not contacted by a volatile organic solvent during its manufacturing process, the washing liquid can comprise packaging solution, and optionally the washing step can be conducted in the blister package.

One example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body; contacting the polymeric lens body with a washing liquid free of a volatile organic solvent to remove extractable material from the polymeric lens body; and packaging the polymeric lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body; contacting the polymeric lens body with a washing liquid free of a volatile organic solvent to remove extractable material from the polymeric lens body; and packaging the polymeric lens body in a contact lens packaging solution in a contact lens package; wherein the silicone hydrogel contact lens is not contacted by a volatile organic solvent during its manufacturing process.

Yet another example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body; contacting the polymeric lens body with a packaging solution free of a volatile organic solvent to remove extractable material from the polymeric lens body; and packaging the polymeric lens body in a contact lens packaging solution in a contact lens package; wherein the silicone hydrogel contact lens is not contacted by a volatile organic solvent during its manufacturing process.

In accordance with the present disclosure, the polymeric lens body can be packaged along with a contact lens packaging solution in a contact lens package, such as a blister pack or glass vial. Following packaging, the package can be sealed and the polymeric lens body and the contact lens packaging solution can be sterilized, for example, by autoclaving the sealed package, to produce a silicone hydrogel contact lens product.

One example of a method in accordance with the present disclosure is a method of manufacturing a silicone hydrogel contact lens, comprising: providing a polymerizable composition, said polymerizable composition comprising (a) at least one hydrophilic amide monomer having one N-vinyl group present in an amount of from 30 to 60 unit parts by weight; (b) HEMA present in an amount of from 10 to 50 unit parts by weight; and (c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof; polymerizing the polymerizable composition in a contact lens mold assembly to form a polymeric lens body; demolding the mold assembly; delensing the polymeric lens body; placing the polymeric lens body in a contact lens package, contacting the polymeric lens body with a liquid free of a volatile organic solvent to remove extractable material from the polymeric lens body while the lens body is present in the contact lens package; and sealing and sterilizing the contact lens package; wherein the silicone hydrogel contact lens is not contacted by a volatile organic solvent during its manufacturing process.

The present method can further comprise repeating the steps to produce a plurality of the silicone hydro gel contact lenses.

In the present methods, the step of contacting the polymeric lens body with a washing liquid can be understood to be an extraction step because extractable materials can be removed from the polymeric lens body during the process. When the washing liquid comprises water or an aqueous solution free of a volatile organic solvent, the contacting step can be understood to be both an extraction step and a hydration step. In another example of the method, the contacting step can comprise contacting the polymeric lens body with a washing liquid comprising a volatile organic solvent, such as a liquid containing a primary alcohol, such as methanol, ethanol, n-propyl alcohol, and the like. The washing liquid can contain a secondary alcohol, such as isopropyl alcohol, and the like. Using a washing liquid containing one or more volatile organic solvents can be helpful in removing hydrophobic materials from the polymeric lens body, and thus may increase wettability of the resulting silicone hydrogel contact lens. Such methods may be understood to be volatile organic solvent-based extraction steps. In other methods, the contacting step comprises contacting the polymeric lens body with an aqueous washing liquid that is free of a volatile organic solvent. Such methods may be understood to be entirely aqueous washing steps, as no volatile organic solvents are included in the washing liquid. Water-based washing liquid that can be used in such methods include water, such as deionized water, saline solutions, buffered solutions, or aqueous solutions containing surfactants or other non-volatile ingredients that can improve the removal of hydrophobic components from the polymeric contact lens bodies, or can reduce distortion of the polymeric contact lens bodies, compared to the use of deionized water alone.

After washing, the contact lenses can be placed in packages, such as plastic blister packs, with a packaging solution, such as a buffered saline solution, which may or may not contain surfactants, anti-inflammatory agents, anti-microbial agents, contact lens wetting agents, and the like, and can be sealed and sterilized. The packaging solution used to package the silicone hydrogel contact lenses of the present disclosure can comprise a wetting agent to increase wettability of the lens surfaces. However, it will be understood that the lens surfaces of the silicone hydro gel contact lenses of the present disclosure have ophthalmically acceptable wettable surfaces prior to contact with a packaging solution comprising a wetting agent, and the use of a wetting agent in the packaging solution is only to increase the wettability of the already ophthalmically acceptable wettable surfaces, and thus is not needed to provide the contact lens with an ophthalmically acceptable wettable surface.

EXAMPLES

The following Examples illustrate certain aspects and advantages of the present invention, which should be understood not to be limited thereby.

The following chemicals are referred to in the Examples, and may be referred to by their abbreviations.

SiO1: 2-propenoic acid, 2-methyl-, 2-[3-(9-butyl-1,1,3,3,5,5,7,7,9,9-decamethylpentasiloxane-1-yl)propoxy]ethyl ester (CAS number of 1052075-57-6). (Si1 was obtained from Shin-Etsu Chemical Co., Ltd., Tokyo, Japan, as product number X-22-1622).

SiO2: $\alpha,\omega$-Bis(methacryloxypropyl)-poly(dimethyl siloxane)-poly($\omega$-methoxy-poly(ethylenegylcol)propylmethylsiloxane) (the synthesis of this compound can be performed as described in US20090234089, which is incorporated herein by reference)

SiO3: the siloxane monomer of formula (3) where n of formula (3) is 12-16 which has a molecular weight of about 1,500 daltons.

TRIS: 3-[tris(trimethylsilyloxy)silyl]propyl methacrylate (CAS number 17096-07-0)

HEMA: 2-hydroxyethyl methacrylate (CAS number 868-77-9)

VMA: N-vinyl-N-methylacetamide (CAS number 003195786)

NVP: N-vinyl pyrrolidone (CAS number 88-12-0)

HOB: 2-hydroxylbutyl methacrylate (CAS number 29008-35-3)

MMA: Methyl methacrylate (CAS number 80-62-6)

DEGVE: diethylene glycol vinyl ether (CAS number 929-37-3)

TEGDMA: triethylene glycol dimethacrylate (CAS number 109-16-0)

AMA: allyl methacrylate (CAS number 96-05-9)

EGDMA: ethylene glycol dimethacrylate (CAS number 97-90-5)

V-64: 2,2'-Azobis-2-methyl propanenitrile (CAS number 78-67-1)

pTPP: polymerizable TPP: diphenyl(P-vinylphenyl)phosphine (CAS number 40538-11-2)

VPB: vinyl phenyl boronic acid (CAS number 2156-04-9)

UV1: 2-(3-(2H-benzotriazol-2-YL)-4-hydroxy-phenyl) ethyl methacrylate (CAS number 96478-09-0)

Silicone Hydrogel Contact Lens Fabrication and Testing Procedure

The chemical compounds set forth in the Examples were, for each example, weighed out in amounts corresponding to the described unit parts, and combined to form a mixture. The mixture was filtered through a 0.2-5.0 micron syringe filter into a bottle. Mixtures were stored for up to about 2 weeks. The mixtures are understood to be polymerizable silicone hydrogel contact lens precursor compositions, or as used herein, polymerizable compositions. In the Examples, the listed amounts of ingredients are given as unit parts of the polymerizable composition by weight.

A volume of the polymerizable composition was cast molded by placing the composition in contact with a lens defining surface of a female mold member. In all of the following Examples, the molding surface of the female mold member was formed of a non-polar resin, specifically polypropylene. A male mold member was placed in contact with the female mold member to form a contact lens mold assembly comprising a contact lens shaped cavity containing the polymerizable composition. In the following Examples, the molding surface of the male mold member was formed of a non-polar resin, specifically polypropylene.

Contact lens mold assemblies were placed in an oven in an air atmosphere to allow the polymerizable composition to thermally cure. For all of Examples, the contact lens mold assemblies were exposed to temperatures of at least about 55° C. for about 1 hour. Examples of curing profiles which can be used to cure silicone hydrogel contact lenses described herein include exposing the contact lens mold assemblies to temperatures of 55° C. for 40 minutes, 80° C. for 40 minutes, and 100° C. for 40 minutes. Other contact lenses can be made with the same curing profile, but instead of the first temperature being at 55° C., it can be at 65° C.

After polymerizing the polymerizable composition to form a polymeric lens body contained in a mold assembly, the contact lens mold assemblies were demolded to separate the male and female mold members. The polymeric lens body remained adhered to the male mold or the female mold. A dry demolding process where the mold assembly is not contacted with a liquid medium can be used, or a wet demolding process where the mold assembly is contacted with a liquid medium such as, for example, water or an aqueous solution, can be used. A mechanical dry demolding process can involve applying mechanical force to a portion of one or both of the mold members in order to separate the mold members. In all of the following Examples, a dry demolding process was used.

The polymeric lens body was then delensed from the male mold or female mold to produce a delensed polymeric lens body. In one example of a delensing method, the polymeric lens body can be delensed from the male mold member using a dry delensing process, such as by manually peeling the lens from the male mold member or by compressing the male mold member and directing a gas toward the male mold member and the polymeric lens body, and lifting the dry polymeric lens body with a vacuum device from the male mold member, which is discarded. In other methods, the polymeric lens body can be delensed using a wet delensing process by contacting the dry polymeric lens body with a liquid releasing medium, such as water or an aqueous solution. For example, a male mold member with the attached polymeric lens body can be dipped into a receptacle containing a liquid until the polymeric lens body separates from the male mold member. Or, a volume of liquid releasing medium can be added to the female mold to soak the polymeric lens body in the liquid and to separate the lens body from the female mold member. In the following Examples, a dry delensing process was used. Following separation, the lens body can be lifted from the mold member manually using tweezers or using a vacuum device and placed into a tray.

The delensed lens product was then washed to remove extractable materials from the polymeric lens body, and hydrated. Extractable materials included polymerizable components such as, for example, monomers, or cross-linking agents, or any optional polymerizable ingredients such as tints or UV blockers, or combinations thereof, present in the polymerizable composition which remain present in the polymeric lens body in an unreacted form, in a partially reacted form, or in an uncross-linked form, or any combination thereof, following polymerization of the lens body and prior to extraction of the lens body. Extractable materials may have also included any non-polymerizable ingredients present in the polymerizable composition, for example, any optional non-polymerizable tinting agents, or UV blockers, or diluents, or chain transfer agent, or any combination thereof, remaining present in the polymeric lens body following polymerization of the polymeric lens body but prior to extraction of the polymeric lens body.

In other methods, such as those involving wet delensing by contacting the mold and lens with a liquid releasing medium, the delensed polymerized contact lens bodies can be washed to remove extractable components from the lens bodies using a washing liquid that is free of a volatile organic solvent, such as a lower alcohol, for example, methanol, ethanol, or any combination thereof. For example, the delensed polymerized contact lens bodies can be washed to remove extractable components from the lens bodies by contacting the lens bodies with aqueous washing liquids free of a volatile organic solvent, such as, for example, deionized water, or a surfactant solution, or a saline solution, or a buffer solution, or any combination thereof. The washing can take place in the final contact lens package, or can take place in a washing tray or a washing tank.

In the following Examples, following the dry demolding and dry delensing steps, the dry delensed lens bodies were placed in cavities of trays, and the delensed polymeric lens bodies were extracted and hydrated by contacting the polymeric lens bodies with one or more volumes of extraction liquid. The extraction and hydration liquid used in the extraction and hydration process of the Examples consisted of a volatile organic solvent-free extraction and hydration liquid, i.e., entirely aqueous-based extraction and hydration liquid, and was conducted by exposing the lens bodies to the washing liquid for 30 minutes at a time for a total of 4 times. Alternatively, the extraction and hydration process can comprise at least two extraction steps in separate portions of ethanol, followed by at least one extraction step in a portion of a 50:50 wt/wt ethanol:water solution of Tween 80, followed by at least three extraction and hydration steps in separate portions of a solution of Tween 80 in deionized water, wherein each extraction or extraction and hydration step lasted from about 5 minutes to 3 hours.

Washed, extracted and hydrated lenses were then placed individually in contact lens blister packages with a phosphate buffered saline packaging solution. The blister packages were sealed and sterilized by autoclaving.

Following sterilization, lens properties such as contact angle, including dynamic and static contact angle, oxygen permeability, ionoflux, modulus, elongation, tensile strength, water content, and the like were determined, as described herein.

For the present contact lenses, contact angles including dynamic and static contact angles, can be determined using routine methods known to persons of ordinary skill in the art. For example, the advancing contact angle and receding contact angle of the contact lenses provided herein can be measured using a conventional drop shape method, such as the sessile drop method or captive bubble method.

In the following Examples, the advancing and receding contact angle of silicone hydrogel contact lenses was determined using a Kruss DSA 100 instrument (Kruss GmbH, Hamburg), and as described in D. A. Brandreth: "Dynamic contact angles and contact angle hysteresis", Journal of Colloid and Interface Science, vol. 62, 1977, pp. 205-212 and R. Knapikowski, M. Kudra: Kontaktwinkelmessungen nach dem Wilhelmy-Prinzip-Ein statistischer Ansatz zur Fehierbeurteilung", Chem. Technik, vol. 45, 1993, pp. 179-185, and U.S. Pat. No. 6,436,481, all of which are incorporated by reference herein.

As an example, the advancing contact angle and receding contact angle was determined using a captive bubble method using phosphate buffered saline (PBS; pH=7.2). The lens was flattened onto a quartz surface and rehydrated with PBS for at least 10 minutes before testing. An air bubble was placed onto a lens surface using an automated syringe system. The size of the air bubble was increased and decreased to obtain the receding angle (the plateau obtained when increasing the bubble size) and the advancing angle (the plateau obtained when decreasing the bubble size).

The modulus, elongation, and tensile strength values of the present lenses can be determined using routine methods known to persons of ordinary skill in the art, such as, for example, a test method in accordance with ANSI Z80.20. The modulus, elongation, and tensile strength values reported herein were determined by using an Instron Model 3342 or 3343 mechanical testing system (Instron Corporation, Norwood, Mass., USA) and Bluehill Materials Testing Software, using a custom built rectangular contact lens cutting die to prepare the rectangular sample strip. The modulus, elongation and tensile strength were determined inside a chamber having a relative humidity of least 70%. The lens to be tested was soaked in phosphate buffered solution (PBS) for at least 10 minutes prior to testing. While holding the lens concave side up, a central strip of the lens was cut using the cutting die. The thickness of the strip was determined using a calibrated gauge (Rehder electronic thickness gauge, Rehder Development Company, Castro Valley, Calif., USA). Using tweezers, the strip was loaded into the grips of the calibrated Instron apparatus, with the strip fitting over at least 75% of the grip surface of each grip. A test method designed to determine the maximum load (N), the tensile strength (MPa), the strain at maximum load (% elongation) and the mean and standard deviation of the tensile modulus (MPa) was run, and the results were recorded.

The percent energy loss of the present silicone hydrogel contact lenses can be determined using routine methods known to persons of ordinary skill in the art. For the following Examples, the percent energy loss was determined using an Instron Model 3343 (Instron Corporation, Norwood, Mass., USA) mechanical testing system, with a 10N force transducer (Instron model no. 2519-101) and Bluehill Materials Testing Software including a TestProfiler module. The energy loss was determined inside a chamber having a relative humidity of least 70%. Before testing, each lens was soaked in phosphate buffered solution (PBS) for at least 10 minutes. Using tweezers, the lens was loaded into the grips of the calibrated Instron apparatus, with the lens loaded vertically between the grips as symmetrically as possible so that the lens fit over at least 75% of the grip surface of each grip. A test designed to determine the energy required to stretch the lens to 100% strain and then return it to 0% strain at a rate of 50 mm/minute was then run on the lens. The test was conducted only once on a single lens. Once the test was finished, energy loss was calculated using the following equation: Lost Energy (%)=(Energy to 100% strain−Energy to return to 0% strain)/Energy to 100% strain×100%.

The ionoflux of the present lenses can be determined using routine methods known to persons of ordinary skill in the art. For the lenses of the following Examples 1-25, the ionoflux was measured using a technique substantially similar to the "Ionoflux Technique" described in U.S. Pat. No. 5,849,811, which is incorporated by reference herein. Prior to measurement, a hydrated lens was equilibrated in deionized water for at least 10 minutes. The lens to be measured was placed in a lens-retaining device, between male and female portions. The male and female portions included flexible sealing rings which were positioned between the lens and the respective male or female portion. After positioning the lens in the lens-retaining device, the lens-retaining device was then placed in a threaded lid. The lid was screwed onto a glass tube to define a donor chamber. The donor chamber was filled with 16 ml of 0.1 molar NaCl solution. A receiving chamber was filled with 80 ml of deionized water. Leads of the conductivity meter were immersed in the deionized water of the receiving chamber and a stir bar was added to the receiving chamber. The receiving chamber was placed in a water bath and the temperature was held at about 35° C. Finally, the donor chamber was immersed in the receiving chamber such that the NaCl solution inside the donor chamber was level with the water inside the receiving chamber. Once the temperature inside the receiving chamber was equilibrated to 35 degrees C., measurements of conductivity were taken every 2 minutes for at least 10 minutes. The conductivity versus time data was substantially linear, and was used to calculate the ionoflux value for the lenses tested.

The oxygen permeability (Dk) of the present lenses can be determined using routine methods known to persons of ordinary skill in the art. For example, the Dk value can be determined using a commercially available instrument under the model designation of MOCON® Ox-Tran System (Mocon Inc., Minneapolis, Minn., USA), for example, using the Mocon Method, as described in U.S. Pat. No. 5,817,924, which is incorporated by reference herein. The Dk values of the lenses of the following Examples 1-25 were determined using the method described by Chhabra et al. (2007), A single-lens polarographic measurement of oxygen permeability (Dk) for hypertransmissible soft contact lenses. Biomaterials 28: 4331-4342, which is incorporated by reference herein.

The equilibrium water content (EWC) of the present lenses can be determined using routine methods known to persons of ordinary skill in the art. For the lenses of the following Examples a hydrated silicone hydrogel contact lens was removed from an aqueous liquid, wiped to remove excess surface water, and weighed. The weighed lens was then dried in an oven at 80 degrees C. under a vacuum, and the dried lens was then weighed. The weight difference was determined by subtracting the weight of the dry lens from the weight of the hydrated lens. The water content (%) is the (weight difference/hydrated weight)×100.

The percentage of the wet extractable component or dry extractable component in a lens can be determined by extracting the lenses in an organic solvent in which the polymeric lens body is not soluble in accordance to methods known to those of ordinary skill in the art. For the lenses of the following Examples, an extraction in methanol using a Sohxlet extraction process was used. For determination of the wet extractable component, a sample (e.g., at least 5 lenses per lot) of fully hydrated and sterilized contact lenses was prepared by removing excess packaging solution from each lens and drying them overnight in an 80° C. vacuum oven. For determination of the dry extractable component, a sample of polymeric lens bodies which had not been washed, extracted, hydrated or sterilized was prepared by drying the lens bodies overnight in an 80° C. vacuum oven. When dried and cooled, each lens was weighed to determine its initial dry weight (W1). Each lens was then placed in a perforated, stackable Teflon thimble, and the thimbles were stacked to form an extraction column with an empty thimble placed at the top of the column. The extraction column was placed into a small Sohxlet extractor attached to a condenser and a round bottom flask containing 70-80 ml methanol. Water was circulated through the condenser and the methanol was heated until it gently boiled. The lenses were extracted for at least 4 hours from the time condensed methanol first appeared. The extracted lenses were again dried overnight at 80° C. in a vacuum oven. When dried and cooled, each lens was weighed to obtain the dry weight of the extracted lens (W2), and the following calculation was made for each lens to determine the percent wet extractable component: [(W1−W2)/W1]×100.

TABLE 1

| Ingredient | Formulation # | | | | | | | |
|---|---|---|---|---|---|---|---|---|
| (unit parts by weight) | A1 | A2 | A3 | A4 | A5 | A6 | A7 | A8 |
| SiO1 | 25 | 25 | 25 | 27 | 28 | 30 | 27 | 30 |
| HEMA | 25 | 30 | 25 | 23 | 22 | 20 | 30 | 27 |
| NVP | 50 | 45 | 50 | 50 | 50 | 50 | 43 | 43 |
| AMA | 0.25 | 0.25 | 0.25 | 0.25 | 0.25 | 0.25 | 0.25 | 0.25 |
| EGDMA | 0.2 | 0.1 | 0.1 | 0.1 | 0.1 | 0.1 | 0.1 | 0.1 |
| V-64 | 0.5 | 0.5 | 0.5 | 0.5 | 0.5 | 0.5 | 0.5 | 0.5 |
| pTPP | 0.5 | 0.5 | 0.5 | 0.5 | 0.5 | 0.5 | 0.5 | 0.5 |
| VPB | 2 | 2 | | 2 | 2 | 2 | | |
| UV1 | | 1.7 | 1.7 | 1.7 | 1.7 | 1.7 | 1.7 | 1.7 |
| WBUT (seconds) | | | | | | >20 | >20 | >20 |
| Swell Factor (%) | | | | 30.80% | 31% | 30% | 29.30% | 28.70% |
| Ionoflux (×10$^3$ mm$^2$/min) | 4.84 ± 0.30 | | 6.29 ± 0.25 | | | 4.26 ± 0.12 | 5.15 ± 0.39 | 4.86 ± 0.42 |
| Modulus (MPa) | 0.77 ± 0.01 | | 0.59 ± 0.04 | | | 0.70 ± 0.04 | | 0.64 ± 0.19 |
| Elongation (%) | 252 ± 81 | | 289 ± 8 | | | 293 ± 88 | | 236 ± 27 |
| Tensile Strength (MPa) | 1.02 ± 0.47 | | 0.97 ± 0.1 | | | 1.22 ± 0.61 | | 0.78 ± 0.15 |
| Equilibrium Water Content (%) | 55.3 ± 0.4 | | 58.3 ± 0.5 | | 54.4 ± 0.7 | 52.5 ± 0.1 | 53.2 ± 0.3 | 52.7 ± 0.2 |
| Oxygen Permeability (barrers) | | | 41.5 ± 5.1 | 37.4 ± 1.7 | 37.1 ± 0.8 | 40.5 ± 1.8 | | |
| Energy Loss (%) | | | | | | | | 29.3 ± 1.3 |
| Wet extractables (MeOH, %) | | | 4.3 ± 0.6 | | 2.8 ± 0.7 | 4.4 ± 0.6 | 3.9 ± 0.1 | 3.8 ± 0.4 |
| Dry extractables (MeOH, %) | | 5.7 ± 2.2 | 4.7 ± 0.1 | 4.1 ± 1.2 | | | | |

TABLE 2

| Ingredient (unit parts by weight) | Formulation # | | | | | | |
|---|---|---|---|---|---|---|---|
| | B1 | B2 | B3 | B4 | B5 | B6 | B7 |
| SiO1 | 25 | 25 | 25 | 28 | 28 | 28 | 28 |
| SiO2 | | | | | | | |
| SiO3 | | | | | | | |
| TRIS | | | | | | | |
| HEMA | 15 | 30 | 30 | 17 | 27 | 25 | 22 |
| VMA | 30 | 35 | 30 | 30 | 35 | 35 | 35 |
| NVP | | | | | | | |
| HOB | 15 | | | 12 | | 10 | |
| MMA | | | | | | | |
| DEGVE | 10 | 10 | 15 | 10 | 10 | | 10 |
| TEGDMA | | | | | | | |
| AMA | 0.25 | 0.25 | 0.25 | 0.25 | 0.25 | 0.25 | 0.2 |
| EGDMA | 0.2 | 0.2 | 0.2 | 0.1 | 0.2 | 0.1 | 0.1 |
| V-64 | 0.5 | 0.5 | 0.5 | 0.5 | 0.5 | 0.5 | 0.5 |
| pTPP | 0.5 | 0.5 | 0.5 | 0.5 | 0.5 | 0.5 | 0.5 |
| VPB | 2 | 2 | 2 | | 2 | | 2 |
| UV1 | | | | 1.7 | 1.7 | 1.7 | 1.7 |
| n-propanol | | | | | | | |
| WBUT (seconds) | | >20 | 19, 25 | | | | |
| Swell Factor (%) | 24.60% | | | 24.40% | 23.90% | 26.60% | 26.10% |
| Ionoflux ($\times 10^{-3}$ mm$^2$/min) | 2.75 ± 0.87 | 5.92 ± 0.50 | 5.25 ± 0.41 | 3.52 ± 0.74 | | 3.69 ± 0.70 | 6.17 ± 0.45 |
| Modulus (MPa) | 0.95 ± 0.01 | | 0.88 ± 0.05 | 0.55 ± 0.03 | 0.85 ± 0.03 | 0.64 ± 0.06 | 0.67 ± 0.02 |
| Elongation (%) | 185 ± 46 | | 190 ± 12 | 243 ± 43 | 217 ± 6 | 336 ± 10 | 216 ± 22 |
| Tensile Strength (MPa) | 0.81 ± 0.23 | | 0.74 ± 0.03 | 0.70 ± 0.16 | 0.84 ± 0.02 | 1.22 ± 0.07 | 0.70 ± 0.08 |
| Energy Loss (%) | | | | | | | |
| Equilibrium Water Content (%) | 52.4 ± 0.7 | 56.1 ± 0.3 | 55.3 ± 0.3 | 52.8 ± 0.2 | | | |
| Oxygen Permeability (barrers) | | 34.2 ± 0.4 | 36.9 ± 0.1 | 46.3 ± 4.8 | | | 41.1 ± 2.2 |
| Wet extractables (MeOH, %) | 2.5 ± 0.7 | | | | | | |

TABLE 3

| Ingredient (unit parts by weight) | Formulation # | | | | | | |
|---|---|---|---|---|---|---|---|
| | B8 | B9 | B10 | B11 | B12 | B13 | B14 |
| SiO1 | 28 | 28 | 28 | 28 | 28 | | |
| SiO2 | | | | | | | 4 |
| SiO3 | | | | | | 17 | 15 |
| TRIS | | | | | | 18 | 15 |
| HEMA | 25 | 15 | 25 | 15 | 25 | 15 | 15 |
| VMA | 32 | 42 | 30 | 40 | 30 | | |
| NVP | | | | | | 42 | 42 |
| HOB | | 10 | | 15 | 8 | | |
| MMA | | | | | | 4 | 6 |
| DEGVE | 10 | | 15 | | 7 | | |
| TEGDMA | | | | | | 1.1 | 0.8 |
| AMA | 0.2 | 0.25 | 0.25 | 0.25 | 0.25 | | |
| EGDMA | 0.1 | 0.1 | 0.1 | 0.1 | 0.1 | | |
| V-64 | 0.5 | 0.5 | 0.5 | 0.8 | 0.8 | 0.7 | 0.7 |
| pTPP | 0.5 | 0.5 | 0.5 | 0.5 | 1 | 0.5 | 0.5 |
| VPB | 2 | 2 | | | | | |
| UV1 | 1.7 | 1.7 | 1.7 | 1.7 | 1.7 | 1.7 | 1.7 |
| n-propanol | | | | | | 10 | 10 |
| WBUT (seconds) | | >20 | | | | >20 | |
| Swell Factor (%) | 24.30% | 26.60% | | 30.90% | 25.30% | | |
| Ionoflux ($\times 10^{-3}$ mm$^2$/min) | 5.24 ± 0.37 | 1.73 ± 0.38 | | 2.79 ± 0.33 | | 3.7 ± 0.3 | 4.35 ± 0.6 |
| Modulus (MPa) | 0.61 ± 0.02 | 0.78 ± 0.03 | 0.34 ± 0.01 | 0.48 ± 0.01 | 0.53 ± 0.03 | 0.66 ± 0.03 | 0.53 ± 0.01 |
| Elongation (%) | 242 ± 43 | 281 ± 46 | 246 ± 65 | 378 ± 32 | 271 ± 17 | 448 ± 22 | 507 ± 47 |
| Tensile Strength (MPa) | 0.73 ± 0.13 | 1.15 ± 0.22 | 0.53 ± 0.16 | 1.54 ± 0.3 | 0.88 ± 0.03 | 2.6 ± 0.3 | 2.67 ± 0.7 |
| Energy Loss (%) | | | | | | 46.6 ± 0.5 | 38.64 ± 0.64 |
| Equilibrium Water Content (%) | | | | | | 52.1 ± 0.3 | 52.88 ± 0.3 |
| Oxygen Permeability (barrers) | | | | | | 63 | 56 ± 2 |
| Wet extractables (MeOH, %) | | | | | | 5.5 ± 0.4 | 3.97 ± 0.3 |

Although the disclosure herein refers to certain illustrated embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the additional disclosure.

A number of publications and patents have been cited hereinabove. Each of the cited publications and patents are hereby incorporated by reference in their entireties.

What is claimed is:

1. A silicone hydrogel contact lens, comprising:
an ophthalmically acceptably clear polymeric lens body, the polymeric lens body being the reaction product of a miscible polymerizable composition comprising
(a) at least one hydrophilic amide monomer having one N-vinyl group present in an amount of from 30 to 60 unit parts by weight;
(b) 2-hydroxyethyl methacrylate (HEMA) present in an amount of from 10 to 50 unit parts by weight; and
(c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof, wherein the siloxane monomer of formula (1) is a siloxane monomer represented by formula (1):

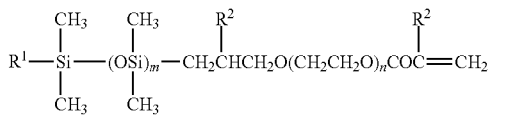

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group; the siloxane of formula (2) is a siloxane monomer represented by formula (2):

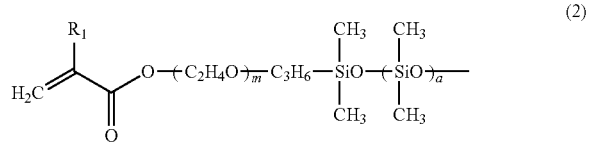

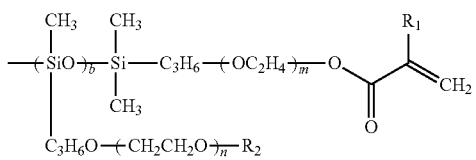

wherein $R_1$ of formula (2) is selected from either hydrogen or a methyl group; $R_2$ of formula (2) is selected from either of hydrogen or a $C_{1-4}$ hydrocarbon group; m of formula (2) represents an integer of from 0 to 10; n of formula (2) represents an integer of from 4 to 100; a and b of formula (2) represent integers of 1 or more; a+b of formula (2) is equal to 20-500; b/(a+b) is equal to 0.01-0.22, and the configuration of siloxane units includes a random configuration; the siloxane monomer of formula (3) is a siloxane monomer represented by formula (3):

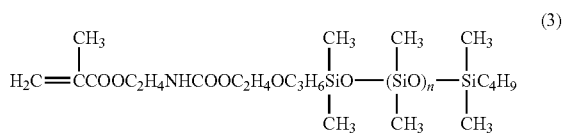

wherein n of formula (3) is an integer from 0-30.

2. The contact lens of claim 1, wherein the polymerizable composition further comprises a second siloxane monomer or second siloxane monomer component.

3. The contact lens of claim 2, wherein the second siloxane monomer or monomer component comprises 3-[tris(trimethylsilyloxy)silyl] propyl methacrylate (TRIS), or monomethacryloxypropyl terminated polydimethylsiloxane (MCS-M11), or both.

4. The contact lens of claim 1, wherein a total amount of siloxane monomers present in the polymerizable composition is from about 20 unit parts to about 40 unit parts.

5. The contact lens of claim 1, wherein the polymerizable composition further comprises at least one cross-linking agent having at least one acrylate or methacrylate polymerizable functional group in its molecular structure.

6. The contact lens of claim 1, wherein the polymerizable composition further comprises at least one cross-linking agent having at least one vinyl polymerizable functional group and at least one acrylate or methacrylate polymerizable functional group in its molecular structure.

7. The contact lens of claim 1, wherein the polymerizable composition is essentially free of N,N-dimethylacrylamide (DMA).

8. The contact lens of claim 1, wherein when the first siloxane monomer component comprises the siloxane monomer of formula (2) having a number average molecular weight of at least 7,000 daltons in an amount of greater than 7 unit parts by weight, the polymerizable composition further comprises at least one organic diluent.

9. The contact lens of claim 1, wherein the polymeric lens body, when fully hydrated, has an oxygen permeability of from 50 to 70 barrers.

10. The contact lens of claim 1, wherein the polymeric lens body, when fully hydrated, has an oxygen permeability from 30 to 50 barrers.

11. The contact lens of claim 1, wherein the polymeric lens body has a light transmittance of at least 90% for wavelengths from 380 nm to 780 nm.

12. A batch of silicone hydrogel contact lenses, comprising a plurality of the contact lens of claim 1, wherein the batch of silicone hydrogel contact lenses, when fully hydrated, has at least two average values selected from an average equilibrium water content (EWC) from about 30% to about 70%, an average tensile modulus from about 0.2 MPa to about 0.9 MPa, and an average energy loss from about 25% to about 35%, an average swell factor from about 24% to about 40%; based on averages of values determined for at least 20 individual lenses of the batch.

13. A method of manufacturing a silicone hydrogel contact lens, comprising:
providing a polymerizable composition, said polymerizable composition comprising
(a) at least one hydrophilic amide monomer having one N-vinyl group present in an amount of from 30 to 60 unit parts by weight;
(b) 2-hydroxyethyl methacrylate (HEMA) present in an amount of from 10 to 50 unit parts by weight; and
(c) a first siloxane monomer component, wherein a total amount of siloxane monomer(s) present in the polymerizable composition is an amount of from 15 to 40 unit parts by weight, the first siloxane monomer component comprising at least one siloxane monomer selected from a siloxane monomer of formula (1), a siloxane monomer of formula (2), a siloxane monomer of formula (3), or any combination thereof, wherein the siloxane monomer of formula (1) is a siloxane monomer represented by formula (1):

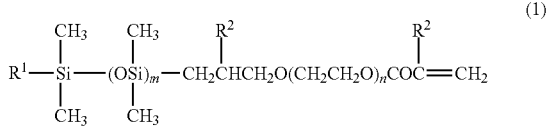

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group; the siloxane of formula (2) is a siloxane monomer represented by formula (2):

wherein $R_1$ of formula (2) is selected from either hydrogen or a methyl group; $R_2$ of formula (2) is selected from either of hydrogen or a $C_{1-4}$ hydrocarbon group; m of formula (2) represents an integer of from 0 to 10; n of formula (2) represents an integer of from 4 to 100; a and b of formula (2) represent integers of 1 or more; a+b of formula (2) is equal to 20-500; b/(a+b) is equal to 0.01-0.22, and the configuration of siloxane units includes a random configuration; the siloxane monomer of formula (3) is a siloxane monomer represented by formula (3):

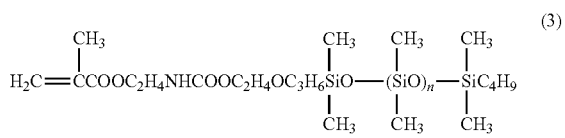

wherein n of formula (3) is an integer from 0-30;
polymerizing the polymerizable composition in a contact lens mold assembly to form a polymeric lens body;
contacting the polymeric lens body with a washing liquid to remove extractable material from the polymeric lens body; and
packaging the polymeric lens body in a contact lens packaging solution in a contact lens package.

14. The method of claim 13, wherein the polymerizing step comprises polymerizing the polymerizable composition in a contact lens mold assembly having a molding surface formed of a non-polar thermoplastic polymer to form a polymeric lens body.

15. The method of claim 13, wherein the polymerizing step comprises polymerizing the polymerizable composition in a contact lens mold assembly having a molding surface formed of a polar thermoplastic polymer to form a polymeric lens body.

16. The method of claim 13, wherein the polymerizing step of is conducted in an atmosphere consisting essentially of air.

17. The method of claim 13, wherein the delensed lens body is separated from the mold section to which it is attached by contacting the polymerized lens body with an aqueous liquid free of volatile organic solvent.

18. The method of claim 13, wherein the delensed lens body is separated from the mold section to which it is attached by mechanically removing the polymerized lens body without contacting the lens body with any liquid.

19. The method of claim 13, wherein the contacting step comprises contacting the polymeric lens body with a washing liquid that is free of a volatile organic solvent.

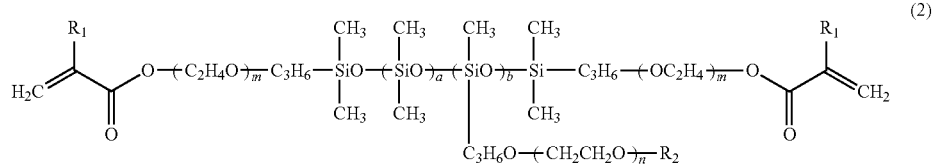

20. The method of claim 13, wherein the silicone hydrogel contact lens is not contacted by a volatile organic solvent during its manufacturing process.

\* \* \* \* \*